||

US011422811B2

(12) United States Patent
Gerzon et al.

(10) Patent No.: US 11,422,811 B2
(45) Date of Patent: *Aug. 23, 2022

(54) RESTARTABLE CACHE WRITE-BACK AND INVALIDATION

(71) Applicant: Intel Corporation, Santa Clara, CA (US)

(72) Inventors: Gideon Gerzon, Zichron Yaakov (IL); Dror Caspi, Kiryat Yam (IL); Arie Aharon, Haifa (IL); Ido Ouziel, Ein Carmel (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/098,129

(22) Filed: Nov. 13, 2020

(65) Prior Publication Data

US 2021/0064375 A1    Mar. 4, 2021

Related U.S. Application Data

(63) Continuation of application No. 16/227,881, filed on Dec. 20, 2018.

(51) Int. Cl.
*G06F 12/0804* (2016.01)
*G06F 9/30* (2018.01)
*G06F 9/455* (2018.01)

(52) U.S. Cl.
CPC ...... *G06F 9/30101* (2013.01); *G06F 9/30065* (2013.01); *G06F 9/45558* (2013.01); *G06F 12/0804* (2013.01); *G06F 2009/45583* (2013.01); *G06F 2212/1044* (2013.01)

(58) Field of Classification Search
CPC ............ G06F 9/30101; G06F 9/30065; G06F 9/45558; G06F 12/0804; G06F 2009/45583; G06F 2212/1044
See application file for complete search history.

(56) References Cited

U.S. PATENT DOCUMENTS

| 10,838,722 | B2 * | 11/2020 | Gerzon | ............... G06F 12/0891 |
| 2004/0073751 | A1 * | 4/2004 | Horrigan | ............. G06F 12/0804 |
| | | | | 711/135 |
| 2015/0248357 | A1 * | 9/2015 | Kaplan | ............... G06F 9/45558 |
| | | | | 713/193 |

OTHER PUBLICATIONS

Non-Final Office Action, U.S. Appl. No. 16/227,881, dated Mar. 18, 2020, 9 pages.
Notice of Allowance, U.S. Appl. No. 16/227,881, dated Jul. 7, 2020, 7 pages.

* cited by examiner

*Primary Examiner* — Edward J Dudek, Jr.
(74) *Attorney, Agent, or Firm* — Nicholson De Vos Webster & Elliott LLP

(57) ABSTRACT

A processor includes a global register to store a value of an interrupted block count. A processor core, communicably coupled to the global register, may, upon execution of an instruction to flush blocks of a cache that are associated with a security domain: flush the blocks of the cache sequentially according to a flush loop of the cache; and in response to detection of a system interrupt: store a value of a current cache block count to the global register as the interrupted block count; and stop execution of the instruction to pause the flush of the blocks of the cache. After handling of the interrupt, the instruction may be called again to restart the flush of the cache.

20 Claims, 15 Drawing Sheets

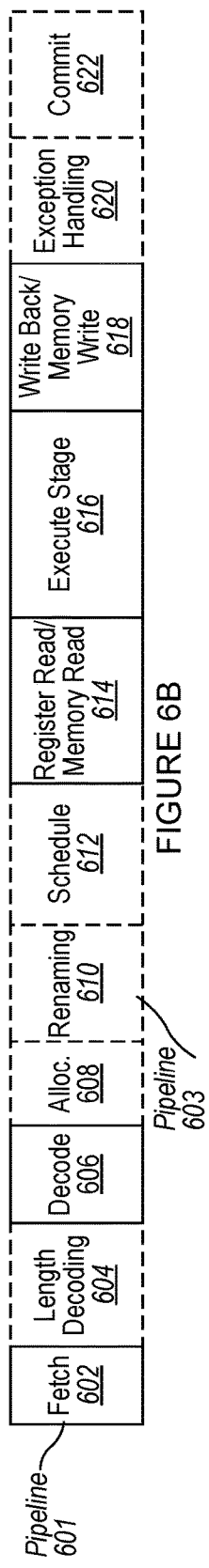
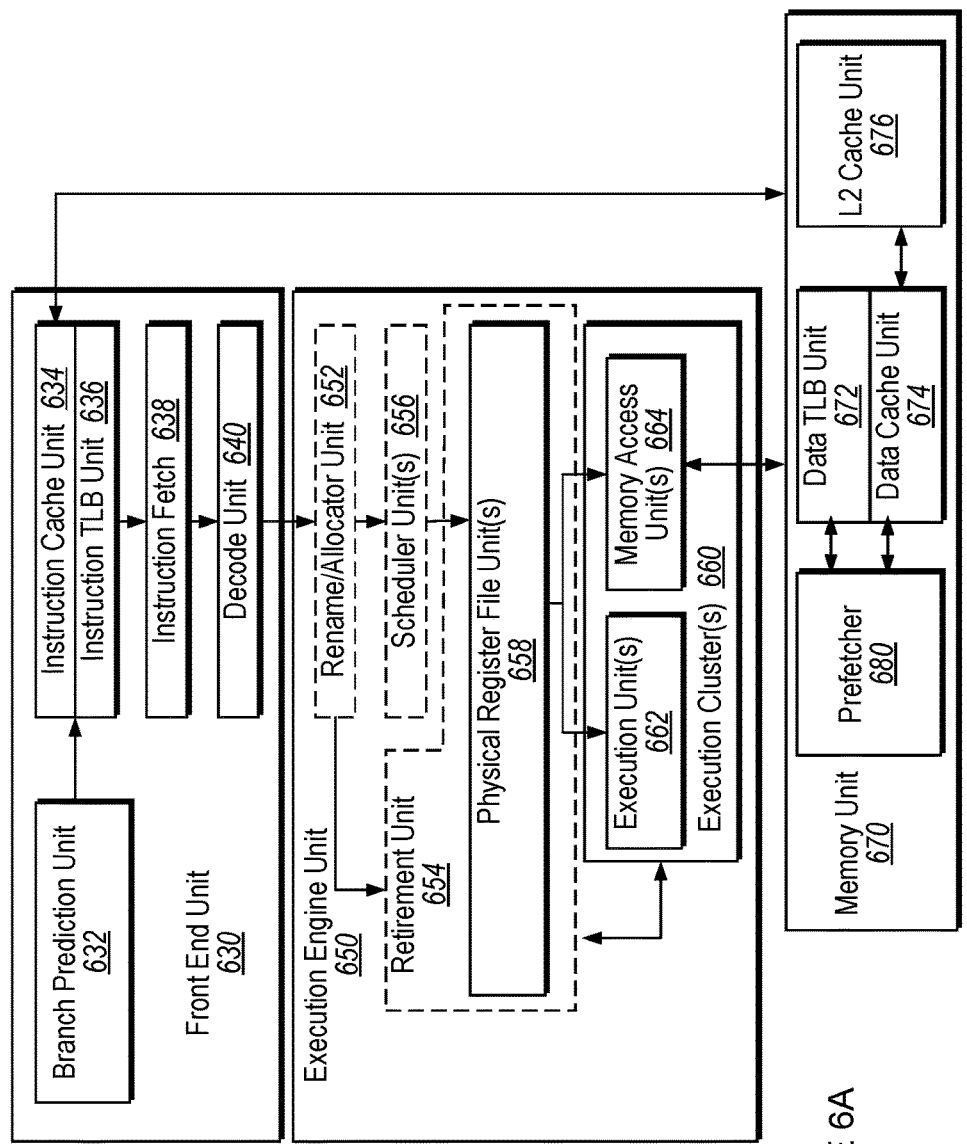
FIGURE 6B
FIGURE 6A (1)

RESTARTABLE CACHE WRITE-BACK AND INVALIDATION

CROSS-REFERENCE TO RELATED APPLICATIONS

The present patent application is a continuation application claiming priority from U.S. patent application Ser. No. 16/227,881, filed Dec. 20, 2018, and entitled: "RESTARTABLE CACHE WRITE-BACK AND INVALIDATION", which is incorporated herein by reference in its entirety.

TECHNICAL FIELD

The disclosure relates to protection of data stored in memory of a computer system, and more particularly, to restartable cache write-back and invalidation.

BACKGROUND

Modern computing systems employ disk encryption to protect data stored at rest on hard drive disks or other data storage. Attackers, however, can use a variety of techniques including bus scanning, memory scanning, and the like, to retrieve data from memory. The memory may itself include the keys used for disk encryption, thus exposing the data encrypted on a disk drive. Various techniques, therefore, have been employed to protect sensitive data residing in at least some regions of memory. Doing so has become challenging, particularly in a cloud or server environment where multiple customer workloads (from different entities) may be supported simultaneously on the same server.

BRIEF DESCRIPTION OF THE DRAWINGS

FIG. 6A is a block diagram illustrating an in-order pipeline and a register renaming stage, out-of-order issue/execution pipeline according to one implementation.

FIG. 6B is a block diagram illustrating a micro-architecture for a processor or an integrated circuit that may implement hardware support for restartable cache write-back and invalidation, according to an implementation of the disclosure.

DETAILED DESCRIPTION

Figure 1A:
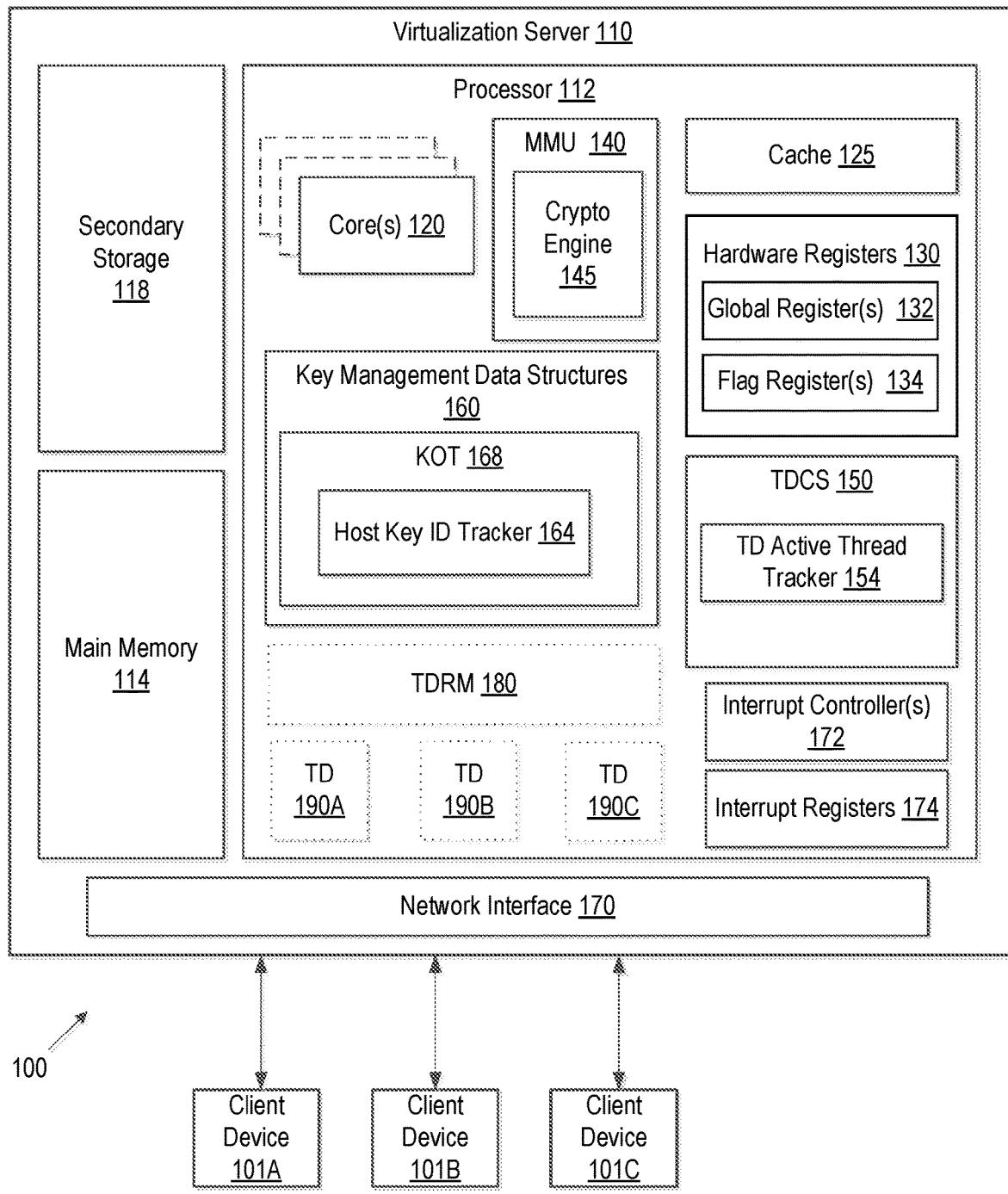
FIGS. 1A and 1B are a schematic block diagram of an example computing system that provides the ability to interrupt and restart a write-back and invalidation of cache, according to various implementations.

Various techniques have been employed to protect sensitive data residing in regions of memory. Some processors provide cryptographic mechanisms for encryption, integrity, and replay protection. Memory encryption protects the confidentiality of memory-resident data. For example, total memory encryption (TME) may encrypt data that is moving from a processor core to memory, and may decrypt the encrypted data on its way back to the processor core. A TME cryptographic engine may be adapted to support multiple keys in a multi-key (MK) hardware cryptographic engine, e.g., a MK-TME engine. The MK-TME engine may support a different key per secure domain serviced by a server, e.g., up to dozens or even thousands of domains on a given server hosted by a cloud service provider (CSP). Domains may refer to workloads, such as a client machine (e.g., virtual machine), an operating system, an application, or other types of workloads the server supports that may be associated with different customer entities.

Processor architecture may also be extended to provide isolation in virtualized systems using trust domains (TDs). A current trend in computing is the placement of data and enterprise workloads in the cloud by utilizing hosting services provided by CSPs. As a result of the hosting of the data and enterprise workloads in the cloud, customers (referred to as tenants herein) of the CSPs are requesting better security and isolation solutions for their workloads. In particular, customers are seeking out solutions that enable the operation of CSP-provided software outside of a Trusted Computing Base (TCB) of the tenant's software. The TCB of a system refers to a set of hardware, firmware, and/or software components that have an ability to influence the trust for the overall operation of the system, and be viewed as tenant specific.

In implementations, a TD architecture and instruction set architecture (ISA) extensions (referred to herein as TD extensions (TDX)) for the TD architecture is provided to provide confidentiality (and integrity) for customer (tenant) software executing in an untrusted CSP infrastructure. The TD architecture, which may be a System-on-Chip (SoC) capability, provides isolation between TD workloads and CSP software, such as a virtual machine monitor (VMM) of the CSP. Components of the TD architecture may include: 1) memory encryption via the MK-TME engine; 2) a resource management capability referred to herein as the trust domain resource manager (TDRM), which may be an extension of a virtual machine monitor (VMM) (or hypervisor); and 3) TDX key management via key management data structures that will be discussed in more detail. The TD architecture provides an ability of the processor to deploy TDs that leverage the MK-TME engine, the TDRM, and the TDX key management for secure operation of TD workloads.

In one implementation, the tenant's software is executed in an architectural concept known as a TD. A TD (also referred to as a tenant TD) refers to a tenant workload, which may include an operating system (OS) alone along with other ring-3 applications running on top of the OS, or a virtual machine (VM) running on top of a VMM along with other ring-3 applications, for example. Each TD operates independently of other TDs in the system and uses logical processor(s), memory, and I/O assigned by the TDRM on the platform. Each TD is cryptographically-isolated in memory using at least one exclusive encryption key of the MK-TME engine for encrypting the memory (holding code and/or data) associated with the trust domain. These benefits extend to the ability of a CSP to support a growing number of customer workloads on the same server (or server farm), to adapt to growing demands for cloud-based hardware resources.

In implementations, the TDRM in the TD architecture acts as a host for the TDs and has full control of the cores and other platform hardware. A TDRM may assign software in a TD with logical processor(s). The TDRM, however, does not access a TD's execution state on the assigned logical processor(s). Similarly, a TDRM assigns physical memory and I/O resources to the TDs, but is not privy to access the memory state of a TD due to the use of separate encryption keys enforced per TD by processor-based memory management, and other integrity and replay controls on memory. Software executing in a TD may operate with reduced privileges so that the TDRM can retain control of platform resources. However the TDRM does not affect the confidentiality or integrity of the TD state in memory or in the CPU structures under defined circumstances.

In one implementation, the TDRM (or the VMM portion of the TDRM) may assign a host key ID (e.g., HKID) to a TD, which may be restricted keys that are kept private. Each HKID may be associated with a corresponding private encryption key. Additionally, the TDRM (or the VMM) may assign MK-TME key IDs to various programs being executed by a piece of software, which could be a VM, a TD, an operation system, or other ring-3 application, for example. These MK-TME key IDs may be shared in the sense that multiple pieces of software may be assigned an MK-TME key ID, e.g., in order to access a shared hardware device such as an I/O device. Each MK-TME key ID may be associated with a corresponding shared encryption key. Although the TDRM (or VMM) may make key ID assignment in this way, the TDRM and VMM are untrusted software not within the TCB of guest TDs.

Figure 2:
FIG. 2 is a block diagram representative of a physical memory address with a key identifier (ID) appended as most-significant bits of the physical memory address according to an implementation.

In implementations, a memory controller such as a memory management unit (MMU), which may include a cryptographic engine such as the MK-TME engine, may use the key IDs to perform encryption and decryption using keys corresponding to the key IDs for corresponding programs. One way to manage key access is to append a key ID to the upper-most bits of a physical address in main memory that the memory controller can check, e.g., as illustrated in FIG. 2. Bits of the key ID may be further partitioned to delineate a private key ID (e.g., an HKID) from a shared key ID (e.g., a MK-TME key ID). When a memory transaction (such as a load or a store operation) reaches the memory controller, the memory controller may strip out or otherwise access the upper (or most significant) bits of the physical address and use them to identify the key with which to encrypt or decrypt the data associated with the memory transaction. Key IDs may also be stored into page tables, appended to physical addresses, which are accessed via paging or via page walks during address translation by the VMM.

Although the memory controller (e.g., the MK-TME engine portion of the memory controller) may use a certain number of the upper-most bits to determine the key ID, the memory controller reads the entire string of bits as the physical address (to include the key ID bits), which creates multiple cache lines for the same physical address that may have two different key IDs. This approach of using physical address aliasing for key IDs means that when a physical page is moved from one key domain to another, or from memory in which the physical pages reside undergoes a change in memory type, all lines cached in the coherent domain that are prefixed with the old key ID are flushed out, e.g., written back to main memory and invalidated, to avoid data corruption. This is the case where a location in main memory was encrypted for use by one program (or memory type) and has to be cleared for use by another, different program or memory type. The memory controller is to ensure there are no copies of that data in the cache that are associated with the old key ID.

In various implementations, cache flush may be employed in various contexts of particular software flows. One context may be a change to memory type, for example, where non-coherent agents may require write-back and invalidation of caches when using memory that was configured as write-back memory that is instead going to be used as direct memory access (DMA) memory. Another context may be to de-schedule a VM in a MK-TME memory system, e.g., as in preparation to reallocate a key ID assigned to a first VM to a second VM or software program. Yet another context may be for a TD, within a MK-TME memory system, where the VMM is to flush the caches before the VMM can reclaim (and reallocate) a TD key ID (or HKID) to a different TD.

In some implementations, when page reallocation is performed as part of software flows such as TD or VM teardown, the VMM (or other control software) does not know which lines from memory allocated to that TD or VM are currently cached in different levels of cache. Accordingly, the VMM (or other control software) resorts to using a write-back invalidate (WBINVD) instruction (or other all-cache-flush instruction) to writeback data from and mark as invalid cache lines associated with the old VM or TD, e.g., that include the key ID previously assigned to the old VM or TD. In implementations, the WBINVD instruction is implemented by performing a loop that iterates through all cache blocks of all caches in a coherent computing system, matching the key ID included in the instruction with metadata associated with cache lines in content accessible memory (CAM). This match of the key ID may be against an address tag or as separate metadata items listed separately from the address tag in metadata storage of the caches. Data of matching cache lines are written back to memory. These cache lines are also marked as invalid, e.g., as per an invalidity bit in the cache metadata.

The latency of all-cache-flush instructions may be very long (e.g., as long as a few seconds) depending on memory configurations and on processor cache sizes and topologies. During the cache flush flow, the processor (or impacted processor core depending on scope of the cache flush) cannot respond to system interrupts. Not being able to respond to system interrupts in a reasonable time frame (which is measured in microseconds) is problematic both for operating systems and for real-time services provided by device management software and the like. System interrupts as referred to herein may be hardware-generated interrupts, e.g., from an input-output (I/O) device, from system management interrupts, or from machine fatal errors. Other types of hardware-generated interrupts are envisioned from which cache flush may be interruptible.

In various implementations, a processor core, a processor, and/or other processing logic of the system may be allowed to respond to interrupts during a cache flush. This may be performed by suspending the cache flush upon detection of a system interrupt, allowing untrusted software (e.g., VMM) to handle the interrupt and reissue the all-cache-flush instruction, and then resume the cache flush from the location in the cache(s) at which the cache flush was suspended. To do so, the value of a current cache block count in a cache flush loop may be stored (e.g., as a temporary value) at each loop iteration of the cache flush, and then be retained as an interrupted block count when the system interrupt causes the cache flush to be suspended. These values may be stored, for example, in protected storage such as a global register. The untrusted software does not have access to the protected storage, and thus does not have access to the interrupted block count value. The untrusted software, however, may recall the all-cache-flush instruction after handling the system interrupt. The processor hardware may then resume the cache flush by retrieving the value of the interrupted block count in the protected storage, and resuming the cache flush loop from the location in the cache(s) corresponding to the interrupted block count.

These features and others herein described include many benefits, in particular, to facilitate software running on a processing system to respond to system interrupts (or similar events) during long latency cache flush operations, and to resume the cache flush operation from the point of interruption within the cache. Reducing the latency involved with the cache flush operation by making the all-cache-flush instruction interruptible means satisfying requirements for handling interrupts by operating systems and for real time services provided by device management software and the like.

Figure 1B:
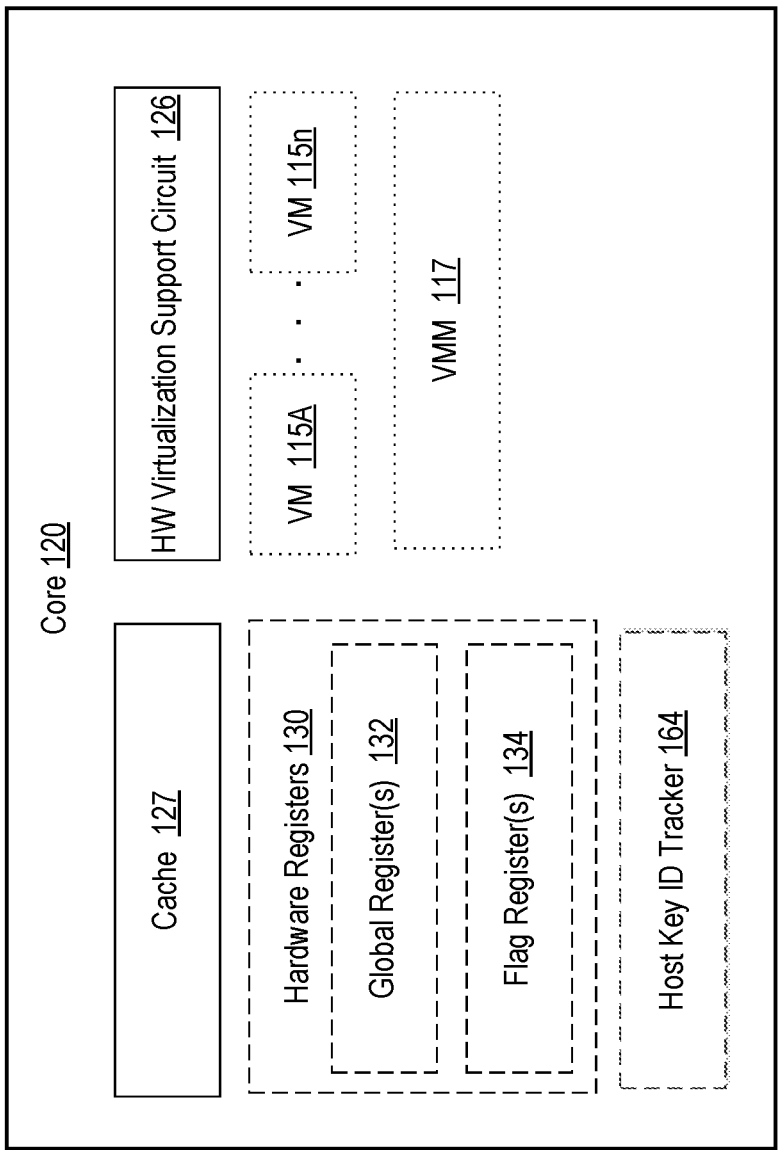

FIGS. 1A and 1B are a schematic block diagram of an example computing system 100 that provides the ability to interrupt and restart a write-back and invalidation of cache, according to various implementations. The computing system 100 may include a virtualization server 110 that supports a number of client devices 101A, 101B, and 101C (e.g., client devices 101A-101C). The virtualization server 110 may include at least one processor 112 (also referred to as a processing device) that executes a TDRM 180. The TDRM 180 may include a VMM (e.g., a hypervisor) that may instantiate one or more TDs 190A, 190B, 190C (e.g., TDs 190A-190C) accessible by the client devices 101A, 101B, and 101C (e.g., client devices 101A-101C) via a network interface 170. The client devices 101A-101C may include, but are not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. The virtualization server 110 may further include main memory 114 (or just "memory") and secondary storage 118 that are coupled to the processor 112.

A TD may refer to a tenant (e.g., customer) workload. The tenant workload may include an OS alone along with other ring-3 applications running on top of the OS, or can include a VM running on top of a VMM along with other ring-3 applications, for example. In implementations, each TD may be cryptographically isolated in memory using a separate exclusive key for encrypting the memory (holding code and data) associated with the TD.

In various implementations, the processor 112 may include one or more cores 120 (also referred to as processing cores), cache 125 (e.g., higher levels of cache, including a last level cache (LLC), to store data read from memory), hardware registers 130, a memory controller such as a memory management unit (MMU) 140, one or more trust domain control structures (TDCS) 150, and key management data structures 160. The hardware registers 130 may include one or more global registers 132 and one or more flag registers 134. The MMU 140 may include a cryptographic engine 145 such as a MK-TME engine and/or other encryption key management logic. The TDCS 150 may include a TD active thread tracker 154. The key management data structures 160 may include a key ownership table (KOT) 168, which may track assignment and management of HKID's among various TDs. The KOT 168 may further include HKID key tracker logic 164. These and other components will be discussed in more detail.

In implementations, the processor 112 may further include interrupt controller(s) 172 and interrupt registers 174 per instruction set architecture. The interrupt controllers 172 may include a Programmable Interrupt Controller (PIC), where the Basic Input/Output System (BIOS) sets interrupt input request lines (IRQs or IRQ lines) per board configuration for onboard, integrated, and add-in PCI devices. The IRQs may be assigned to I/O devices during startup. The interrupt controllers 172 may additionally or alternatively further include a Local Advanced Programmable Interrupt Controller (LAPIC) or an I/O Advanced Programmable Interrupt Controller (IOxAPIC), the latter of which may be located in the I/O Controller Hub (ICH) or the I/O Hub (IOH). These interrupt controllers 172 may use interrupt registers 174 and/or interrupt tables in the memory 114 with which to detect and help handle interrupts in pre-programmed ways, which may include interaction with software that handles the interrupts. The interrupts may be communicated on various IRQ lines and thus become detectable by the interrupt controller 172.

FIG. 1B illustrates components that may be additionally, or alternatively, located within each core 120 of the processor 112. For example, while the core 120 includes its own cache 127 (e.g., lower levels of cache), and a hardware virtualization support circuit 126, the core 120 may include the hardware registers 130 and HKID key tracker logic 164 illustrated within the processor 112 in FIG. 1A. The core 120 may execute a VMM 117 that may in turn instantiate one or more VM's 115A . . . 115n, which are representative of domains running on top of the VMM 117 of the core 120. In various implementations, the all-cache-flush instruction may be performed at system scope, which may include at package level (e.g., through the processor 112 that is instantiated on a single die) or at core level with respect to the core 120, as will be discussed in more detail. This may be performed in terms of the scope of levels of cache included within the flush of the all-cache-flush instruction.

With additional reference to FIG. 1A, as discussed previously, additional programs and workloads may also run on the core 120 and be associated with different domains, data for each to be encrypted and decrypted with unique keys, as controlled by the cryptographic engine 145 and the MMU 140. The TD's 190A-190C may run on top of the TDRM 180, which may include the VMM 117 that the core 120 executes.

In one implementation, the processor 112 implements a TD architecture and ISA extensions (TDX) for the TD architecture. The TD architecture may provide isolation between the TDs 190A-190C and CSP software (e.g., TDRM 180 and/or a CSP VMM, e.g., root VMM of the TDRM 180) executing on the processor 112). Components of the TD architecture may include, for example: 1) memory encryption via the MK-TME engine of the cryptographic engine 145; 2) a resource management capability referred to herein as the TDRM 180; and 3) TDX key management via the key management data structures 160 that will be discussed in more detail. The TDX architecture provides an ability of the processor 112 to deploy TDs 190A-190C that leverage the MK-TME engine, the TDRM 180, the access-controlled TD control structures (e.g., TDCS 150), and the key management data structures 160 for secure operation of TDs 190A-190C.

In implementations of the disclosure, the TDRM 180 acts as a host and has full control of the cores 120 and other platform hardware. The TDRM 180 may assign software in a TD 190A-190C with logical processor(s), where each logical processor is associated with a hardware thread of the processor 112. The TDRM 180, however, cannot access a TD's 190A-190C execution state on the assigned logical processor(s). Similarly, the TDRM 180 assigns physical memory and I/O resources to the TDs 190A-190C, but is not authorized access to the memory state of a TD due to separate encryption keys, and other integrity and replay controls on memory.

With respect to the separate encryption keys, the processor may utilize the MK-TME engine (e.g., which may be or be included in the cryptographic engine 145) to encrypt (and decrypt) memory used during memory operations. With TME, memory accesses by software executing on the core 120 may be encrypted in memory with an encryption key. MK-TME is an enhancement to TME that allows use of multiple encryption keys (the number of supported keys is implementation dependent). The processor 112 may utilize the MK-TME engine to cause different pages to be encrypted using different MK-TME keys, e.g., because the memory operations are associated with different domain or workloads. The MK-TME engine may be utilized in the TD architecture described herein to support one or more unique encryption keys (also referred to as host key IDs (or HKIDs)) per each TD 190A-190C, to help achieve cryptographic isolation between different CSP customer workloads. For example, when MK-TME engine is used in the TD architecture, the processor 112 may enforce, by default, that all pages of a TD are to be encrypted using a unique TD-specific key (or HKID) for that TD. Furthermore, a TD may further choose specific TD pages to be plain text or encrypted using different ephemeral keys that are opaque to CSP software.

One way for the MMU 140 to manage key access is to append each key ID 158 to the upper-most (or most significant) bits of a physical address 156 in main memory that the memory controller can check, e.g., as illustrated in FIG. 2. Bits of the key ID 158 and the physical address 156 may then make up an address tag 160 that will be processed by a cache controller within a memory management system.

In implementations, when a memory transaction (such as a load or a store operation) reaches the MMU 140, the MMU 140 may strip out or otherwise access the upper-most (or key ID 158) bits of the physical address 156 and use them to identify the key with which to encrypt or decrypt the data associated with the memory transaction. In one implementation, the MK-TME engine performs the key ID access and correlation to a unique key associated with that key ID for use in encryption or decryption. For example, the MK-TME engine may store a list (or table or the like) in a key data structure in which key IDs are correlated to different keys that are to be used for secure domains that are to be cryptographically isolated. The MK-TME engine may use up to the six top-most bits of the physical address as the key ID, up to seven of the top-most bits of the physical address as the key ID, or some other number depending on the number of unique keys that are to be correlated to a corresponding number of unique key IDs.

In various implementations, each TD 190A-190C may be a software environment that supports a software stack including VMMs (e.g., using virtual machine extensions (VMX)), OSes, and/or application software (hosted by the OS). Each TD 190A-190C may operate independently of other TDs 190A-190C and use logical processor(s), memory, and I/O assigned by the TDRM 180 on the platform. Software executing in a TD 190A-190C may operate with reduced privileges so that the TDRM 180 can retain control of platform resources; however, the TDRM 180 may not affect the confidentiality or integrity of the TDs 190A-190C under defined circumstances.

The computing system 100 is representative of processing systems based on the PENTIUM III™, PENTIUM 4™, Xeon™, Itanium, XScale™ and/or StrongARM™ microprocessing devices available from Intel Corporation of Santa Clara, Calif., although other systems (including PCs having other microprocessing devices, engineering workstations, set-top boxes and the like) may also be used. In one implementation, sample system 100 executes a version of the WINDOWS™ operating system available from Microsoft Corporation of Redmond, Wash., although other operating systems (UNIX and Linux for example), embedded software, and/or graphical user interfaces, may also be used. Thus, implementations of the disclosure are not limited to any specific combination of hardware circuitry and software.

The one or more processing cores 120 execute instructions of the system. The processing core 120 includes, but is not limited to, pre-fetch logic to fetch instructions, decode logic to decode the instructions, execution logic to execute instructions and the like. In an implementation, the computing system 100 includes a component, such as the processor 112 to employ execution units including logic to perform algorithms for processing data.

In implementations, the main memory 114 and the secondary storage 118 may store program binaries and OS driver events. Data in the secondary storage 118 may be stored in blocks referred to as pages, and each page may correspond to a set of physical memory addresses. The virtualization server 110 may employ virtual memory management in which applications run by the core(s) 120, such as the TDs 190A-190C, use virtual memory addresses that are mapped to guest physical memory addresses, and guest physical memory addresses are mapped to host/system physical addresses by a MMU 140.

The core 120 may execute the MMU 140 to load pages from the secondary storage 118 into the main memory 114 (which includes a volatile memory and/or a non-volatile memory) for faster access by software running on the processor 112 (e.g., on the core). When one of the TDs 190A-190C attempts to access a virtual memory address that corresponds to a physical memory address of a page loaded into the main memory 114, the MMU 140 returns the requested data. The core 120 may execute the VMM portion of TDRM 180 to translate guest physical addresses to host physical addresses of main memory, and provide parameters for a protocol that allows the core 120 to read, walk page tables and extended page tables, and to otherwise interpret these mappings.

The hardware virtualization support circuit 126 (FIG. 1B) may support virtualized execution of operating systems, applications, and other software by the computing device 100. The hardware virtualization support circuit 126 may include virtual machine extensions (VMX) support by providing two modes of execution: VMX-root mode and VMX non-root mode. The VMX-root mode allows executing software to have broad control of the computing device 100 and its hardware resources. Conversely, a hypervisor, (e.g., the VMM 117), or host operating system (OS) may execute in VMX-root mode. The VMX non-root mode restricts access to certain hardware instructions while still implementing the ordinary ring/privilege system of the processor core. One or more guest OSs (e.g., of the VMs) may execute in the VMX non-root mode. Those guest OSs may execute in ring zero, similar to being executed without virtualization. The hardware virtualization support circuit 126 may also support extended page tables (EPT), which may be embodied as hardware-assisted second-level page address translation. The hardware virtualization support circuit 126 may be embodied as, for example, Intel® VT-x technology.

Implementations of the disclosure are not limited to computer systems. Alternative implementations of the disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with at least one implementation.

One implementation may be described in the context of a single processing device desktop or server system, but alternative implementations may be included in a multiprocessing device system. Computing system 100 may be an example of a 'hub' system architecture. The computing system 100 includes a processor 112 to process data signals. The processor 112, as one illustrative example, includes a complex instruction set computer (CISC) microprocessor device, a reduced instruction set computing (RISC) microprocessor device, a very long instruction word (VLIW) microprocessor device, a processing device implementing a combination of instruction sets, or any other processing device, such as a digital signal processing device, for example. The processor 112 is coupled to a processing device bus that transmits data signals between the processor 112 and other components in the computing system 100, such as the main memory 114 and/or secondary storage 118, storing instruction, data, or any combination thereof. The other components of the computing system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In implementations, the main memory 114 includes a DRAM device, a static random access memory (SRAM) device, flash memory device, or other memory device. The main memory 114 may store instructions and/or data represented by data signals that are to be executed by the processor 112, including by the cores 120. The processor 112 may be coupled to the main memory 114 via a processing device bus. A system logic chip, such as a memory controller hub (MCH) may be coupled to the processing device bus and main memory 114. An MCH can provide a high bandwidth memory path to main memory 114 for instruction and data storage and for storage of graphics commands, data and textures. The MCH can be used to direct data signals between the processor 112, main memory 114, and other components in the system 100 and to bridge the data signals between processing device bus, memory, and system I/O, for example. The MCH may be coupled to memory through a memory interface. In some implementations, the system logic chip can provide a graphics port for coupling to a graphics controller through an Accelerated Graphics Port (AGP) interconnect.

The computing system 100 may also include an I/O controller hub (ICH). The ICH can provide direct connections to some I/O devices via a local I/O bus. The local I/O bus is a high-speed I/O bus for connecting peripherals to the main memory 114, chipset, and processor 112. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another implementation of a system, the instructions executed by the core 120 described above can be used with a system on a chip. One implementation of a system on a chip comprises of a processing device and a memory. The memory for one such system is a flash memory. The flash memory can be located on the same die as the processing device and other system components. Additionally, other logic blocks such as a memory controller or graphics controller can also be located on a system on a chip.

Figure 3:
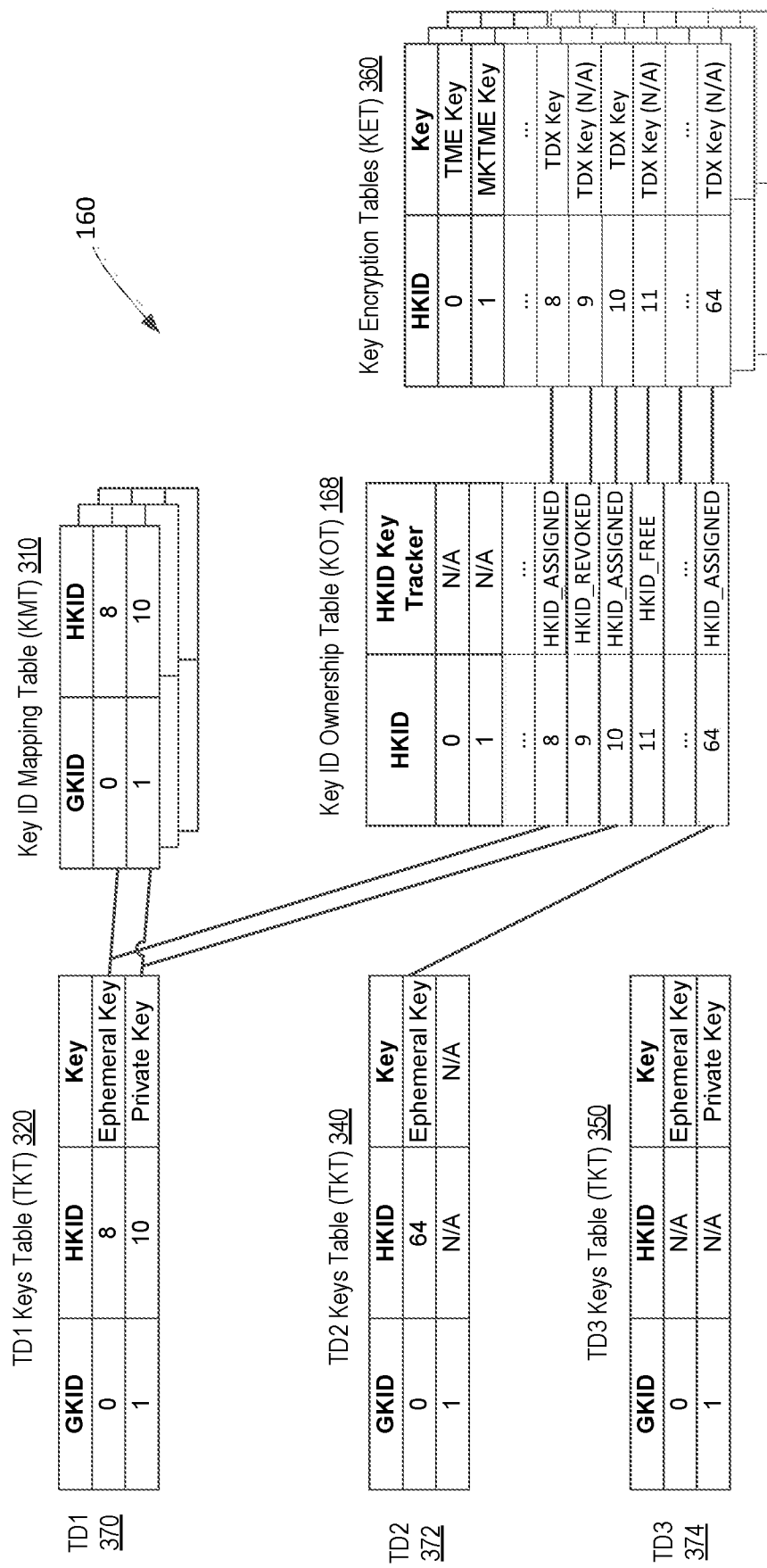
FIG. 3 is a block diagram of the relationships between the key management data structures illustrated in FIG. 1A according to an implementation.

FIG. 3 is a block diagram of the relationships between the key management data structures 160 illustrated in FIG. 1A according to an implementation. The key management data structures 160 may include, in addition to the key ID ownership table (KOT) 168, a key ID mapping table (KMT) 310, a TD1 keys table (first TKT) 320 for a first TD 370, a TD2 keys table (second TKT) for a second TD 372, a TD3 keys table (third TKT) 350 for a third TD 374, and key encryption tables (KET) 360. The block diagram of FIG. 3 illustrates mapping relationships between the KOT 168, the KET 360, and the KMT 310 key management tables, where mappings of both guest key IDs (GKID) and HKIDs are illustrated. A guest GKID may be mapped to an HKID in order to tie a VM to a particular TD. The key management data structures 160 may further include a WBINVD table (WBT) to track the write-back and invalidations (e.g., flush) of cache hierarchies at least for HKIDs, which are marked and reclaimed.

More specifically, the TDX architecture allows the processor 112, through the micro-architectural tables 160, as well as a set of instructions, to implement the encryption logic in a way that ensures secure operations of the TDs 190A-190C within the host system. These instructions support per-TD ephemeral random key generation, assignment of HKIDs from the global pool to a TD, configuration of the memory encryption engine, reclamation of HKIDs from a TD back to the global pool, and secure flushing of any cache that may still hold data that was encrypted using reclaimed HKIDs.

The processor 112 handles the TDX key management functionality through the key management data structures 160, which may be micro-architectural tables for example as illustrated in Table 1. In one implementation, the key management data structures 160 reside directly on host hardware. In another implementation, the key management data structures 160 reside in protected memory in the TDCS 150. The TDCS may be an access-controlled structure that is part of the ISA, and as such is managed and accessed by the processor 112. The key management data structures 160 handling the TDX key management functionality may not be directly accessible by software running on the host system.

TD 372 has a state of HKID_ASSIGNED in the KOT 168. The KET 360 indicates that HKID 64 is within the range dedicated for TDX usage. The KET 360 also shows that the HKID has not been configured in the memory encryption engine yet.

The third TD 374 is an example of a TD that has encryption keys but does not have any assigned HKIDs. In this case, the third TD 374 does not have entries in the key management data structures until at least one HKID is assigned to one of the encryption keys of a TD.

TABLE 1

TDX Key Management Tables

| Table | Scope | Description |
|---|---|---|
| Key Encryption Table (KET) 360 | Package | Micro-architectural table for configuring the encryption engine. The KET is indexed by HKID. Cryptographic engines on a package are configured similarly. A KET entry in the range supporting TDX HKIDs is configured per package by the TDCONFIGKEY instruction. A KET entry in the legacy range is configured per package by the legacy PCONFIG instruction. Note: KET is part of the MK-TME architecture. |
| KeyID Ownership Table (KOT) 168 | Platform | Micro-architectural table for managing the TDX HKIDs inventory. This table may assign HKIDs to TDs, revoke HKIDs from TDs, and control processor cache flush. KOT is indexed by HKID. In some implementations, the KOT entries in the configured TDX HKIDs range are used in TDX key management. |
| WBINVD Table (WBT) | Package or Core | Micro-architectural table for controlling the operation of restartable TDWBINVD. |
| TD Keys Table (TKT) 320, 340, 350 | TD | Table in TDCS 150 for associating a GKID, an HKID, and an encryption key for a TD. The table is indexed by GKID. |
| Key ID Mapping Table (KMT) 310 | LP | Micro-architectural table for configuring the hardware for mapping GKIDs to HKIDs during address translation by the TDENTER instruction. |

The first TD 370 is an example of a TD that has two encryption keys, both with two assigned HKIDs and both have been configured using a TD configuration key (TDCONFIGKEY) instruction (see Table 3). In this case, the first TKT 320 for TD 370 includes the association of an encryption key to each HKID. The first TKT table may only be accessible by the TD 370. The KMT 310 includes the mapping of a guest key ID (GKID) to each HKID, on the logical processor (LP) scope, indicating that the encryption key has been configured and that the TD memory is ready to be accessed by the TD. The KOT 168 includes the state of each HKID, thus each of the HKIDs assigned to TD 370 has a state of HKID_ASSIGNED in the KOT 168. The KET 360 indicates whether an HKID is within the range dedicated for TDX usage, and whether the key identified by the HKID has been configured in the cryptographic engine 145.

The second TD 372 is an example of a TD that has one ephemeral encryption key. The key has been assigned an HKID but has not yet been configured using the TDCONFIGKEY instruction. In this case, the second TKT 340 for the second TD 372 includes the association of the ephemeral encryption key to the HKID and to a GKID. The KMT 310 does not include an entry for the mapping of the GKID to the HKID because the encryption key has not yet been configured in the cryptographic engine 145. The KOT 168 includes the state of each HKID, thus HKID 64 assigned to second The global scope of key management is where the inventory of HKIDs is managed using the KOT, whereas the TD scope is where HKIDs are assigned to TDs, TD keys are configured in the memory encryption engine, and HKIDs are reclaimed from TDs. When an HKID from the KOT is assigned to a TD, the TD scope and the global scope interact and overlap for that HKID because the TD has exclusive access to the HKID. When the HKID is reclaimed from the TD at later time, the interaction between the global scope and the TD scope may cease to exist. This separation between the TD scope and the global scope allows software to perform lazy cache flush sequences, grouping together the flushing of multiple HKIDs.

Figure 4:
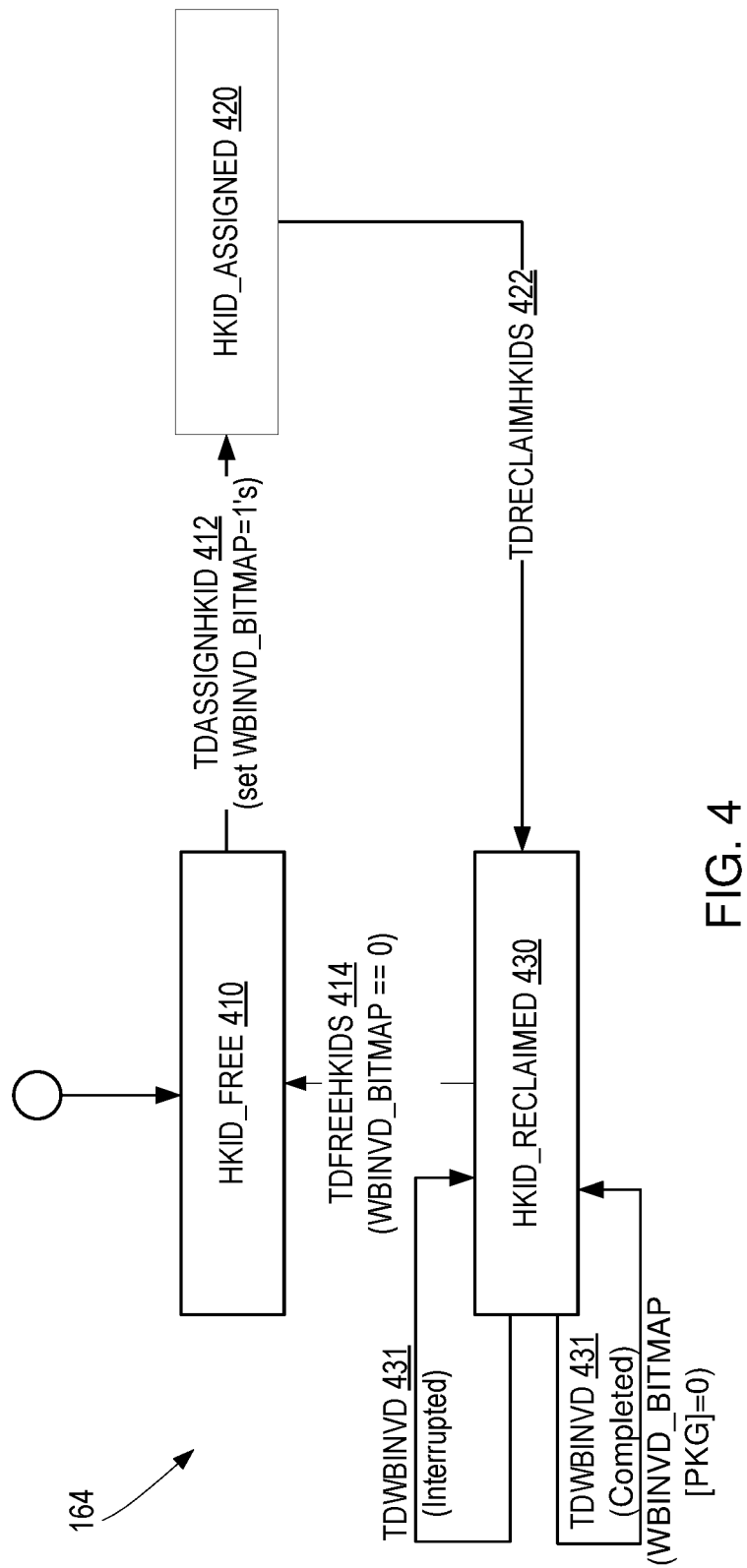
FIG. 4 is a block diagram of key ID tracker logic, which tracks an assignment state of a host key ID (HKID) in the global state scope of key management, according to an implementation.

FIG. 4 is a block diagram of the HKID key tracker logic 164, which tracks an assignment state of an HKID in the global state scope of key management, according to an implementation. In one example, the HKID key tracker logic 164 is a state machine executed to track the states assigned to various TDs in the KOT 168. An HKID may be in one of three states at any given point in time, as depicted in Table 2. The state of each HKID is maintained by the key management data structures 160 in the KOT. As part of maintaining the state of an HKID, the processor 112 may also control the process of flushing cached data that is associated with the HKID. For example, an HKID may not be assigned to a TD if there is data in a cache associated with the HKID that is to be assigned.

TABLE 2

HKID in KOT entry possible states

| HKID State | HKID Assigned to a TD? | Any Data Cached with this HKID? | New Cache Lines may be Created with this HKID? | Comments |
|---|---|---|---|---|
| HKID_FREE | No | No | No | |
| HKID_ASSIGNED | Yes | Yes | Yes | |
| HKID_RECLAIMED | Yes | Yes | No | A sub-state WBINVD_BITMAP may track the cache flush operation on multiple packages/cores. |

The three states of an HKID include a HKID_FREE state 410, a HKID_ASSIGNED state 420, a HKID_RECLAIMED state 430. The state of the HKID depends on the status of the HKID assignment to a TD. An HKID is in the HKID_FREE state 410 when the HKID is not assigned to any TD, or when the HKID is reclaimed from a TD and the cache 125 is flushed for entries encrypted with this HKID (as would be the cache 127 of the core 120 with further application of the flush to core scope). An HKID is in the HKID_ASSIGNED state 420 when the HKID is assigned to a TD. An HKID is in the HKID_RECLAIMED state 430 when the HKID is reclaimed from a TD after having previously been assigned that HKID.

TABLE 3

TD Key Reassignment

| Instruction | Impacts | Execute Per | |
|---|---|---|---|
| TDASSIGNHKID | TD, KOT | one logical processor | Choose a FREE HKID entry in the KOT, mark it as ASSIGNED and set it in the TDCS 150. |
| TDCONFIGKEY | TD | package and TD key | Configure a TD key on the package. |

The initial state of an HKID is the HKID_FREE state 410. In this state, the HKID is not assigned to a TD and the cache 125 may not have data associated with the HKID. When a TD assigned HKID (TDASSIGNHKID) instruction 412 (of Table 3) is executed, the HKID state changes to the HKID_ASSIGNED 420. In this state, the HKID is assigned to a TD. A free HKID may be assigned to a TD if the HKID is designated in the KOT 168 to be used for TD private memory encryption. After assigning the HKID to the TD, the TD may create cache lines in the cache 125 and 127 associated with the HKID. The TDASSIGNHKID instruction 412 may mark the HKID in the KOT 168 as assigned, thus signaling that the TDRM is to remove the HKID from the list of HKIDs assignable by the TDRM to other TDs. The TDASSIGNHKID instruction 412 may acquire exclusive access to the KOT 168.

When the TDRM 180 determines that the number of unassigned HKIDs in the KOT is below a threshold, the TDRM 180 may reclaim an HKID from a TD by executing a TD reclaim HKIDs (TDRECLAIMHKIDS) instruction 422. The threshold may be a configurable parameter associated with the TDRM 180. The TDRM may reclaim the HKID by returning the HKID to the global pool in KOT 168, decoupling the HKID from the TD, and marking the KOT entry for the reclaimed HKID as free. This results in changing the HKID state to the HKID_RECLAIMED state 430. The HKID is no longer assigned to a TD, but there may still be cache entries associated with the reclaimed HKID. The TDRECLAIMHKIDS instruction 422 may acquire exclusive access to the KOT 168.

The TDRM 180 may further execute a TD free HKIDs (TDFREEHKIDS) instruction 414 after reclaiming an HKID to flush cache lines of the cache 125 and 127 that are associated with the reclaimed HKID, as described in Table 4. Flushing the cache lines also involves executing a TD write-back invalidate (TDWBINVD) instruction 431 to cause the processor to write back and invalidate the cache hierarchy (e.g., the cache 125 and 127), at least for the reclaimed HKID. The TDWBINVD instruction 431 may employ a bit map (WBINVD_BITMAP) to designate blocks of cache that are within the scope of the WBVINVD instruction. Execution time of the TDWBINVD instruction 431 is long, but is interruptible by external events and may be restarted by the TDRM (e.g., the VMM portion of the TDRM 180) until completed, as will be discussed in more detail with reference to FIG. 5. When the cache 125 and 127 is flushed, the HKID state may be set back to HKID_FREE 410, and the reclaimed HKID may be reassigned to another TD. The cache flush operation runs in the global scope and may be decoupled from the TD. The TDRM 180 may therefore choose to implement the flush in a lazy fashion, e.g., wait until a certain number of HKIDs in the KOT become reclaimed, e.g., in the HKID_RECLAIMED state 430. In the HKID_FREE 410 state, the HKID is not assigned to a TD and no cache line associated with the HKID exist. The TDFREEHKIDS instruction 414 may acquire exclusive access to the KOT 168.

TABLE 4

Processor Cache Flush Instructions

| Instruction | Scope | Execute Per | Description |
|---|---|---|---|
| TDWBINVD | KOT | Each package or core | Write back and invalidate cache hierarchy, at least for the HKID marked as RECLAIMED. The instruction execution time is long; it is interruptible by external events and may be restarted until completed. |
| TDFREEHKIDS | TD, KOT | One LP | Mark all the TD's RECLAIMED HKIDs as FREE. |

Cache flushing instructions (e.g., the TDWBINVD instruction 431) may walk over all caches, line by line, to determine which lines are associated with a particular HKID, write the data in those cache lines to memory, and mark the metadata associated with those cache lines (e.g., in CAM-type memory) as invalid (e.g., invalidation). Accordingly, when the term "cache flush" is used herein, reference is made to this walk of the cache lines, including matching the HKID to address tags, write back of data for matching cache lines, and invalidation of those matching cache lines. The order of flushing cache lines (by sets and ways in set-associative cache) is micro architectural and may differ between processor implementations. As will be discussed with reference to FIG. 5, however, the processor 112 may generally follow a cache loop through which the processor hardware iterates.

Once a line is flushed, there is no guarantee that software activity on another logical processor (not executing cache flush) in the processor 112 may cause the line to be reloaded into a caching agent while cache flushing flow is still active. Accordingly, it is up to software to prevent activity that may cause a cache line to be reloaded and modified while the cache flush is in progress.

With the TDX key management flows through the state machine of FIG. 4, the processor 112 may ensure that cache lines associated with a reclaimed security domain (such as a VM or TD being reallocated) are not reloaded into the cache 125 and 127 once those cache lines have been flushed. This is done by enforcing in the TDX architecture that the TD that owned the security domain (in process of being deallocated) is quieted before cache flush flow can be used. To be quieted may be understood as being in a quiesced state, e.g., a suspended state or a state of inactivity or dormancy. For a security domain to be reallocated means to move VMM and hardware resources to another domain that is assigned a key ID previously used by a different domain.

More specifically, the TDWBINVD instruction 431 may be called after the TD owning the security domain is in a quiesced state. The TDX architecture guarantees that even when the cache flush operation is interrupted, the TD owning the security domain remains suspended. After the software (e.g., the VMM portion of the TDRM 180) handles the interrupt, the software may resume the cache flush flow that was interrupted by an interrupt, and make sure that cache flushing is successfully completed (e.g., cache flush completion) before it can allocate the security domain (e.g., TD1) to another security domain (e.g., TD2).

For purposes of explanation, assume the processor 112 is about to reallocate a first security domain (e.g., first TD or VM) to a second security domain (e.g., a second TD or VM). For ease of explanation, assume these are trust domains (TDs). In various implementations, to ensure active software of the first TD is suspended, the processor hardware may employ the TD active thread tracker 154 to track the number of executing software threads. When the VMM (e.g., VMM portion of the TDRM 180) calls the TDRECLAIMHKID instruction 422, the processor hardware (e.g., the HKID key tracker logic 164) may suspend execution of the first TD, e.g., may block further launch of any first TD threads when the TD active thread tracker 154 indicates there are no running first TD threads. If there are no first TD threads that remain active, the HKID key tracker logic 164 may put the first HKID (associated with the first TD) in the HKID_RECLAIM state 430. The hardware may also set, in the HKID key tracker logic 164, that the first TD cached data flush has not started yet.

Following successful execution of the TDRECLAIMH-KID instruction 422, e.g., the HKID key tracker logic 164 indicates to the VMM that the first HKID is in the HKID_RECLAIMED state 430, the VMM may call a secure hardware function such as the TDWBINVD instruction 431 to flush all cached data associated with the first TD.

In implementations, the TDWBINVD instruction 431 is a form of an interruptible cache flush operation. Upon the first invocation of this command by the VMM, the processor hardware may tag, in the HKID key tracker logic 164, that the first HKID is in the HKID_RECLAIMED state 430 and that the cache flush has started. Upon the cache flush flow (via execution of the TDWBINVD instruction) being interrupted, the processor hardware may log in protected HW (e.g., in a global register of the global registers 132) the point at which the cache flush loop was interrupted. The TDWBINVD may further exit into software (e.g., the VMM) and report in an interrupt flag within the flag registers 134 that the cache flush was interrupted and thus did not complete. The point in the cache flush loop may, in one implementation, be an iteration number of the flush loop at which the system interrupt occurs.

After the VMM (or other system software) completes handling of the interrupt, the VMM may resume the cache flush by again calling the TDWBINVD instruction 431. The processor hardware (e.g., the HKID key tracker logic 164) may identify, by reading the protected hardware indication of interruption point (e.g., in the global register), that the last execution of the TDWBINVD instruction was interrupted, and may resume cache flush from the point the cache flush loop was interrupted (point saved in the global register).

Upon completion of the cache flush on cached data associated with the first TD, the processor 112 may update the HKID key tracker logic 164 that the first HKID is in the HKID_FREE state 430 and that the cache flush completed. The processor 112 may further return an indication to the software (e.g., the VMM that called the TDWBINVD instruction) that the cache flush is complete.

Figure 5:
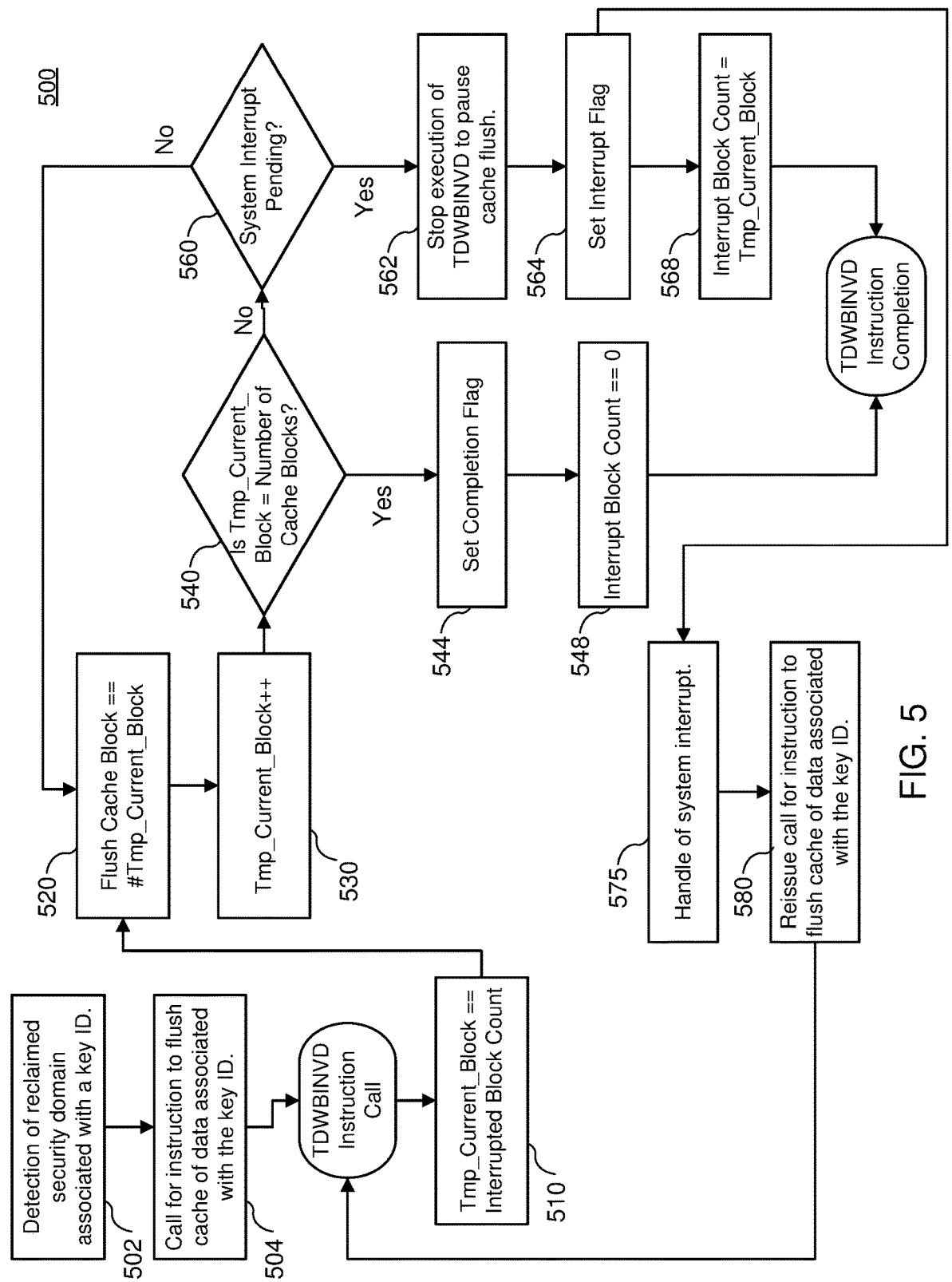
FIG. 5 is a flow chart of a method for execution of a restartable write-back and invalidation of cache, according to various implementations.

FIG. 5 is a flow chart of a method 500 for execution of a restartable write-back and invalidation of cache, according to various implementations. Method 500 may be performed by processing logic that may include hardware (e.g., circuitry, dedicated logic, programmable logic, microcode, etc.), software (such as operations being performed by the TDRM or VMM), firmware or a combination thereof. In one implementation, method 500 is performed by the processor 112 of FIG. 1. In another implementation, the method 500 is performed by any of the processing devices described with respect to FIGS. 6A-15. Alternatively, other components of the computing system 100 (or software executing on the processor 112) may perform some or all of the operations of the method 500.

Referring to FIG. 5, the method 500 may begin with the processing logic executing software (such as the TDRM, the VMM, or other untrusted software) that detects a security domain, which is associated with a key ID, has been reclaimed (502). In one implementation, where the security domain is a first trust domain (TD), the VMM may detect that the first trust domain (or VM), which owns a host key identifier (HKID) to be reclaimed for assignment to a second trust domain, is in a quiesced state. Detecting the quiesced state may be performed, for example, by detecting the HKID of the first trust domain being in the HKID_RECLAIMED state 430 within the key tracker logic 164. The VMM may be attempting to reassign the HKID (or other key ID) to the second trust domain, for example. The quiesced (or reclaimed) state may be indicative that the first trust domain is suspended and thus will not create new cache lines or read existing cache lines identified with the HKID. The method 500 may continue with the processing logic executing the software, which is further to call for execution of an instruction (e.g., the TDWBINVD instruction) to flush cache data associated with the key ID (e.g., the HKID) (504). In other implementations, hardware may issue this call for execution of the TDWBINVD instruction.

With continued reference to FIG. 5, the method 500 may continue with the processing logic responding to a TDWBINVD instruction call (e.g., from the VMM or other software or hardware) by initializing the value for a current cache block count, which is a temporary value used during the cache flush (510). In one implementation, this includes setting the value of the current cache block count to be a value of an interrupted block count upon beginning execution of the TDWBINVD instruction. The interrupted block count may be stored in the global register (e.g., one of the global registers 132) and may be set to zero after completion of the TDWBINVD instruction. The method 500 may continue with the processing logic flushing a cache block associated with the value for the current cache block count (520). The method 500 may continue with the processing logic incrementing the value for the current cache block count (530). In one implementation, the processing logic may further store the value for the current cache block count into the global register (intended to be the interrupt block count) during each iteration of the cache flush loop, so that when interrupted, the value of the current block count in the global register is the point at which the cache flush loop was interrupted. The method 500 may continue with the processing logic determining whether the value for the current cache block count is equal to a total number of cache blocks of the cache (540). This total number of cache blocks may be one of the total number of the blocks in the cache 125, in the cache 127, or in a combination of the cache 125 and 127, depending on a scope of the cache flush.

With continued reference to FIG. 5, if the total number of the current cache block count is equal to the total number of cache blocks, the method 500 may continue with the processing logic setting a completion flag in a flag register (544) and resetting the interrupt block count to a zero value, to reset the interrupt block count (548). The completion flag may be visible to the software that called the TDWBNIVD instruction. If the cache flush has not yet completed, the method 500 may continue with the processing logic detecting whether a system interrupt is pending, e.g., through use of IRQ lines and interrupt controllers 172 as discussed with reference to FIG. 1A (560). If there is no pending interrupt, the method 500 may continue with the processing logic looping back to continue the flush loop by flushing a cache block associated with the value for the current cache block count (520).

If there is a pending system interrupt, the method 500 may continue with the processing logic stopping execution of the TDWBINVD instruction to pause the flush of the cache (562). The method 500 may continue after the TDWBINVD instruction execution has been paused with the processing logic setting an interrupt flag in a flag register to signal to the software (e.g., the VMM) that the cache flush has been interrupted (564) and storing the current cache block count into protected hardware storage (such as the global register) as an interrupted block count (568). In one implementation, the value of the interrupted block count is an iteration number of the cache block flush at which the system interrupt is detected, although in another implementation, the value may also be a physical cache line or physical cache block number at which the flush is paused.

With continued reference to FIG. 5, the method 500 may continue with the processing logic executing the software (e.g., the VMM) that is to detect the interrupt flag (in the flag register) and handle the system interrupt (575). The method 500 may continue with the processing logic executing the software, which is further to reissue a call for execution of the TDWBINVD instruction (580). In this way, the processor 112 may continue to execute the TDWBINVD instruction to continue flushing the cache. This time, the cache flush may start at the initialized value of the current cache block count, e.g., the interrupted block count saved in the global register at block 568 that is read in as the current block count for purposes of restarting the cache flush (510). This allows the cache flush to continue according to the method 500 after an interrupt has been handled and until the cache flush has been completed, e.g., through detection that the current cache block count is equal to the total number of cache blocks (540).

In various implementations, while the software (such as the VMM) that called the TDWBINVD instruction may not get access to the interrupted block count value in the global register, the processing logic (e.g., processor hardware, which can include microcode, performing the cache flush) may be authorized to access the global register and read out the value for the interrupted block count. By disallowing the software access to the interrupted block count value, untrusted software such as the VMM that may call for execution of the TDWBINVD instruction is not allowed to insert or provide a different value for the cache flush. In one implementation, the processor hardware may perform a security check to ensure that the software does not provide a different number for the interrupted block count value other than the one stored in the global register. In this way, the software may not be able to spoof the processor hardware executing the cache flush into thinking that the cache flush has completed when in fact it has not.

FIG. 6A is a block diagram illustrating a micro-architecture for a processor 600 that implements restartable cache write-back and invalidation, according to an implementation. Specifically, processor 600 depicts an in-order architecture core and a register renaming logic, out-of-order issue/execution logic to be included in a processor according to at least one implementation of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one implementation, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different scheduler circuits, including reservations stations (RS), central instruction window, etc. The scheduler unit(s) 656 is coupled to the physical register set unit(s) 658. Each of the physical register set units 658 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set unit(s) 658 is overlapped by the retirement unit 654 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register set unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 656, physical register set unit(s) 658, and execution cluster(s) 660 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set unit, and/or execution cluster—and in the case of a separate memory access pipeline, certain implementations are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some implementations DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary implementation, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one implementation, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some implementations of the disclosure. The solid lined boxes in FIG. 6B illustrate an in-order pipeline 601, while the dashed lined boxes illustrate a register renaming, out-of-order issue/execution pipeline 603. In FIG. 6B, the pipelines 601 and 603 include a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 620, and a commit stage 622. In some implementations, the ordering of stages 602-624 may be different than illustrated and are not limited to the specific ordering shown in FIG. 6B.

Figure 7:
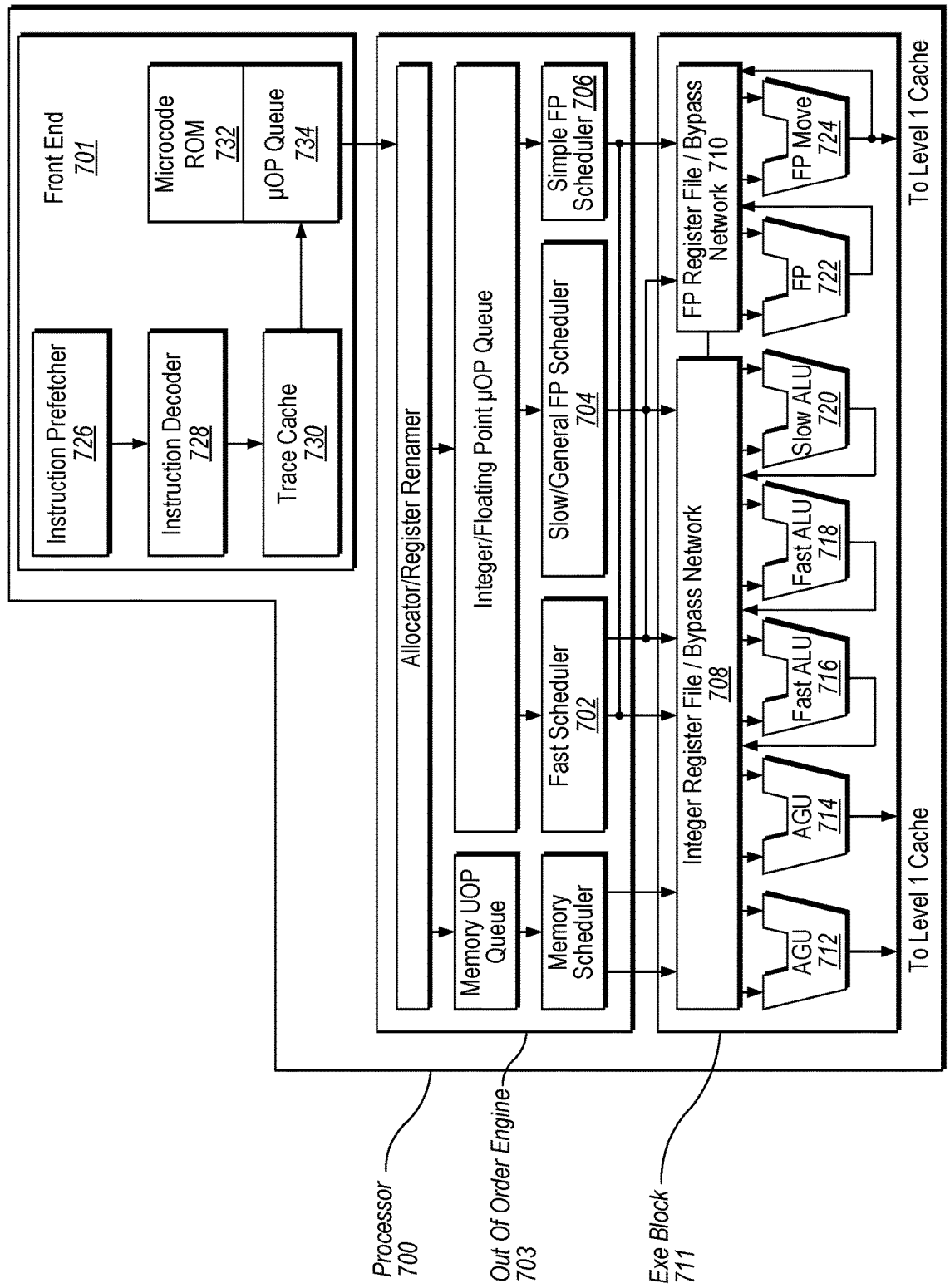
FIG. 7 illustrates a block diagram of the micro-architecture for a processor or an integrated circuit that implements restartable cache write-back and invalidation, according to an implementation of the disclosure.

FIG. 7 illustrates a block diagram of the micro-architecture for a processor 700 that includes logic circuits of a processor or an integrated circuit that implements restartable cache write-back and invalidation, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 701 is the part of the processor 700 that fetches instructions to be executed and prepares them to be used later in the processor pipeline. The implementations of the page additions and content copying can be implemented in processor 700.

The front end 701 may include several units. In one implementation, the instruction prefetcher 726 fetches instructions from memory and feeds them to an instruction decoder 728 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 730 takes decoded uops and assembles them into program ordered sequences or traces in the uop queue 734 for execution. When the trace cache 730 encounters a complex instruction, microcode ROM (or RAM) 732 provides the uops needed to complete the operation.

Some instructions are converted into a single micro-op, whereas others need several micro-ops to complete the full operation. In one implementation, if more than four micro-ops are needed to complete an instruction, the instruction decoder 728 accesses the microcode ROM 732 to do the instruction. For one implementation, an instruction can be decoded into a small number of micro ops for processing at the instruction decoder 728. In another implementation, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one implementation from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one implementation can schedule on each half of the main clock cycle while the other schedulers can only schedule once per main processor clock cycle. The schedulers arbitrate for the dispatch ports to schedule uops for execution.

Register sets 708, 710, sit between the schedulers 702, 704, 706, and the execution units 712, 714, 716, 718, 720, 722, 724 in the execution block 711. There is a separate register set 708, 710, for integer and floating point operations, respectively. Each register set 708, 710, of one implementation also includes a bypass network that can bypass or forward just completed results that have not yet been written into the register set to new dependent uops. The integer register set 708 and the floating point register set 710 are also capable of communicating data with the other. For one implementation, the integer register set 708 is split into two separate register sets, one register set for the low order 32 bits of data and a second register set for the high order 32 bits of data. The floating point register set 710 of one implementation has 128 bit wide entries because floating point instructions typically have operands from 64 to 128 bits in width.

The execution block 711 contains the execution units 712, 714, 716, 718, 720, 722, 724, where the instructions are actually executed. This section includes the register sets 708, 710, that store the integer and floating point data operand values that the micro-instructions need to execute. The processor 700 of one implementation is comprised of a number of execution units: address generation unit (AGU) 712, AGU 714, fast ALU 716, fast ALU 718, slow ALU 720, floating point ALU 712, floating point move unit 714. For one implementation, the floating point execution blocks 712, 714, execute floating point, MMX, SIMD, and SSE, or other operations. The floating point ALU 712 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 716, 718. The fast ALUs 716, 718, of one implementation can execute fast operations with an effective latency of half a clock cycle. For one implementation, most complex integer operations go to the slow ALU 720 as the slow ALU 720 includes integer execution hardware for long latency type of operations, such as a multiplier, shifts, flag logic, and branch processing. Memory load/store operations are executed by the AGUs 722, 724. For one implementation, the integer ALUs 716, 718, 720, are described in the context of performing integer operations on 64 bit data operands. In alternative implementations, the ALUs 716, 718, 720, can be implemented to support a variety of data bits including 16, 32, 128, 256, etc. Similarly, the floating point units 722, 724, can be implemented to support a range of operands having bits of various widths. For one implementation, the floating point units 722, 724, can operate on 128 bits wide packed data operands in conjunction with SIMD and multimedia instructions.

In one implementation, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 8:
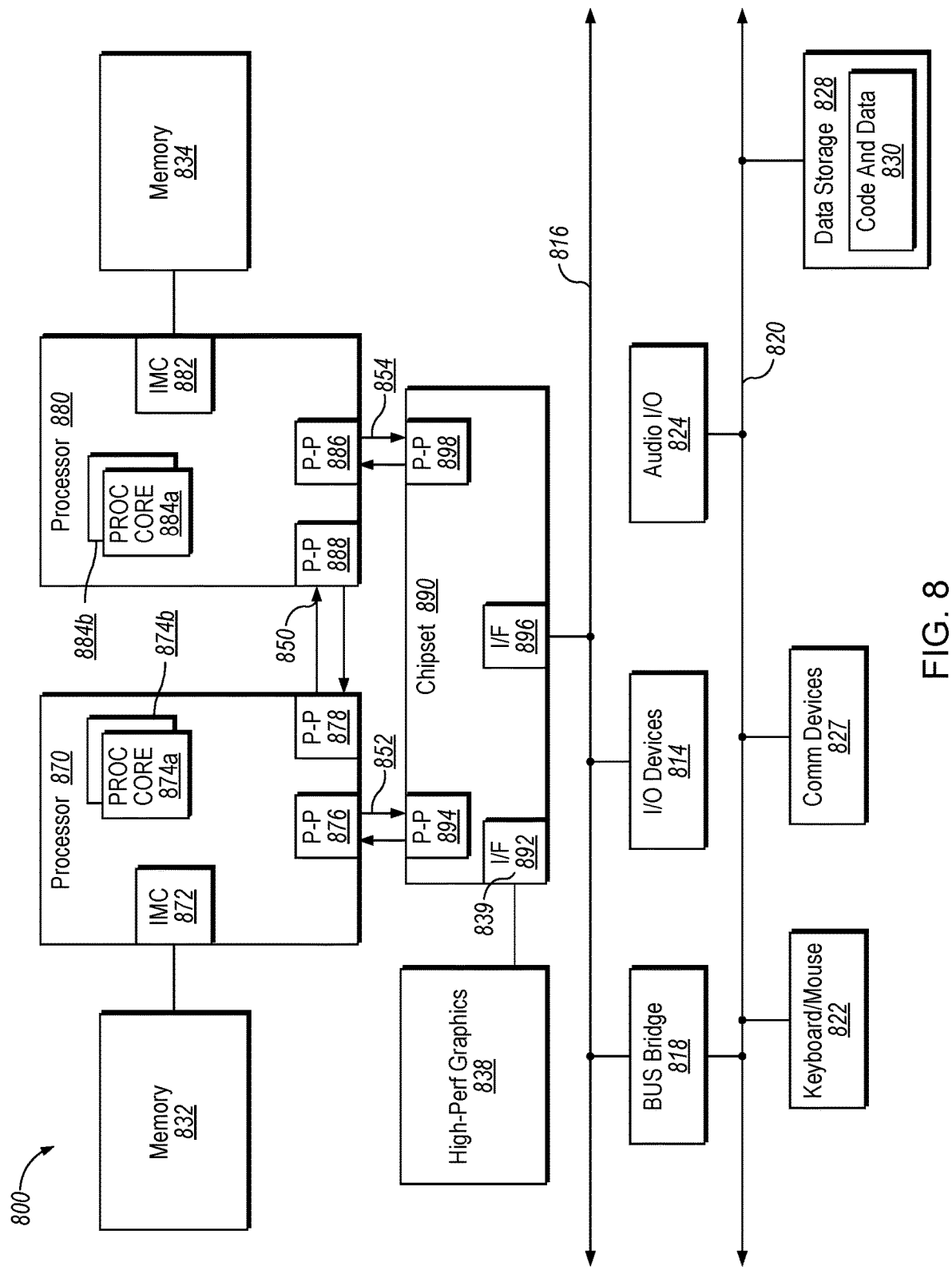
FIG. 8 is a block diagram of a computer system according to one implementation.

Implementations may be implemented in many different system types. Referring now to FIG. 8, shown is a block diagram of a multiprocessor system 800 that may implement hardware support for restartable cache write-back and invalidation, in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. While shown with two processors 870, 880, it is to be understood that the scope of the disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 892.

Chipset 890 may be coupled to a first bus 816 via an interface 896. In one implementation, first bus 816 may be a Peripheral Component Interconnect (PCI) bus, or a bus such as a PCI Express bus or interconnect bus, although the scope of the disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
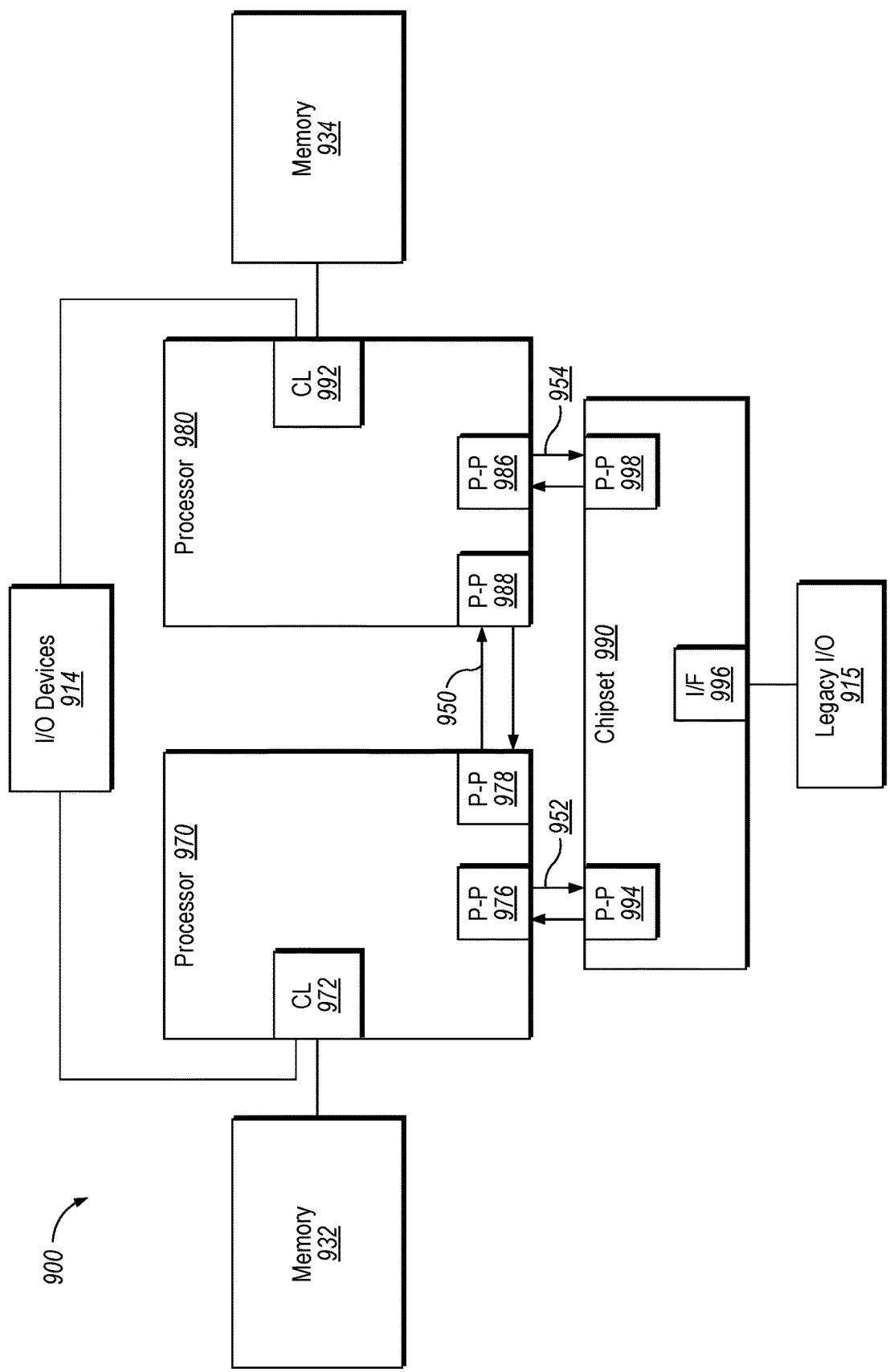
FIG. 9 is a block diagram of a computer system according to another implementation.

Referring now to FIG. 9, shown is a block diagram of a third system 900 that may implement hardware support for restartable cache write-back and invalidation, in accordance with an implementation of the disclosure. Like elements in FIGS. 8 and 9 bear like reference numerals and certain aspects of FIG. 9 have been omitted from FIG. 8 in order to avoid obscuring other aspects of FIG. 9.

FIG. 9 illustrates processors 970, 980. In one embodiment, processors 970, 980 may implement hybrid cores as described above. Processors 970, 980 may include integrated memory and I/O control logic ("CL") 972 and 992, respectively, and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units such as described herein. In addition, CL 972, 992 may also include I/O control logic. FIG. 9 illustrates that the memories 932, 934 are coupled to the CL 972, 992, and that I/O devices 914 are also coupled to the control logic 972, 992. Legacy I/O devices 915 are coupled to the chipset 990 via interface 996.

Figure 10:
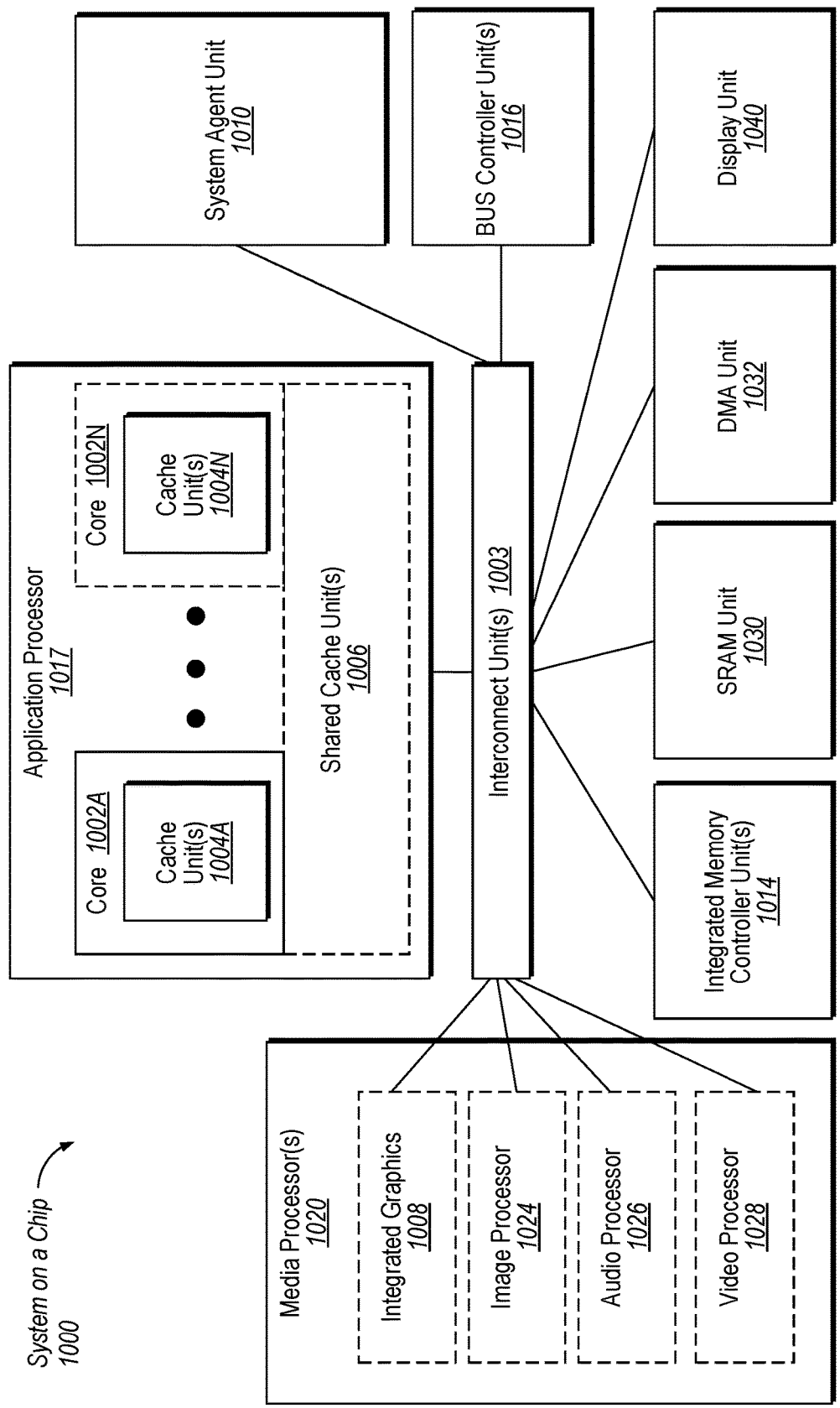
FIG. 10 is a block diagram of a system on a chip according to one implementation.

FIG. 10 is an exemplary system on a chip (SoC) 1000 that may include one or more of the cores 1002A . . . 1002N that may implement hardware support for restartable cache write-back and invalidation. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1000 of FIG. 10, dashed lined boxes are features on more advanced SoCs. An interconnect unit(s) 1003 may be coupled to: an application processor 1017 which includes a set of one or more cores 1002A-N, containing one or more cache unit(s) 1004A ... 1004N, respectively, and shared cache unit(s) 1006; a system agent unit 1010; a bus controller unit(s) 1016; an integrated memory controller unit(s) 1014; a set of one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
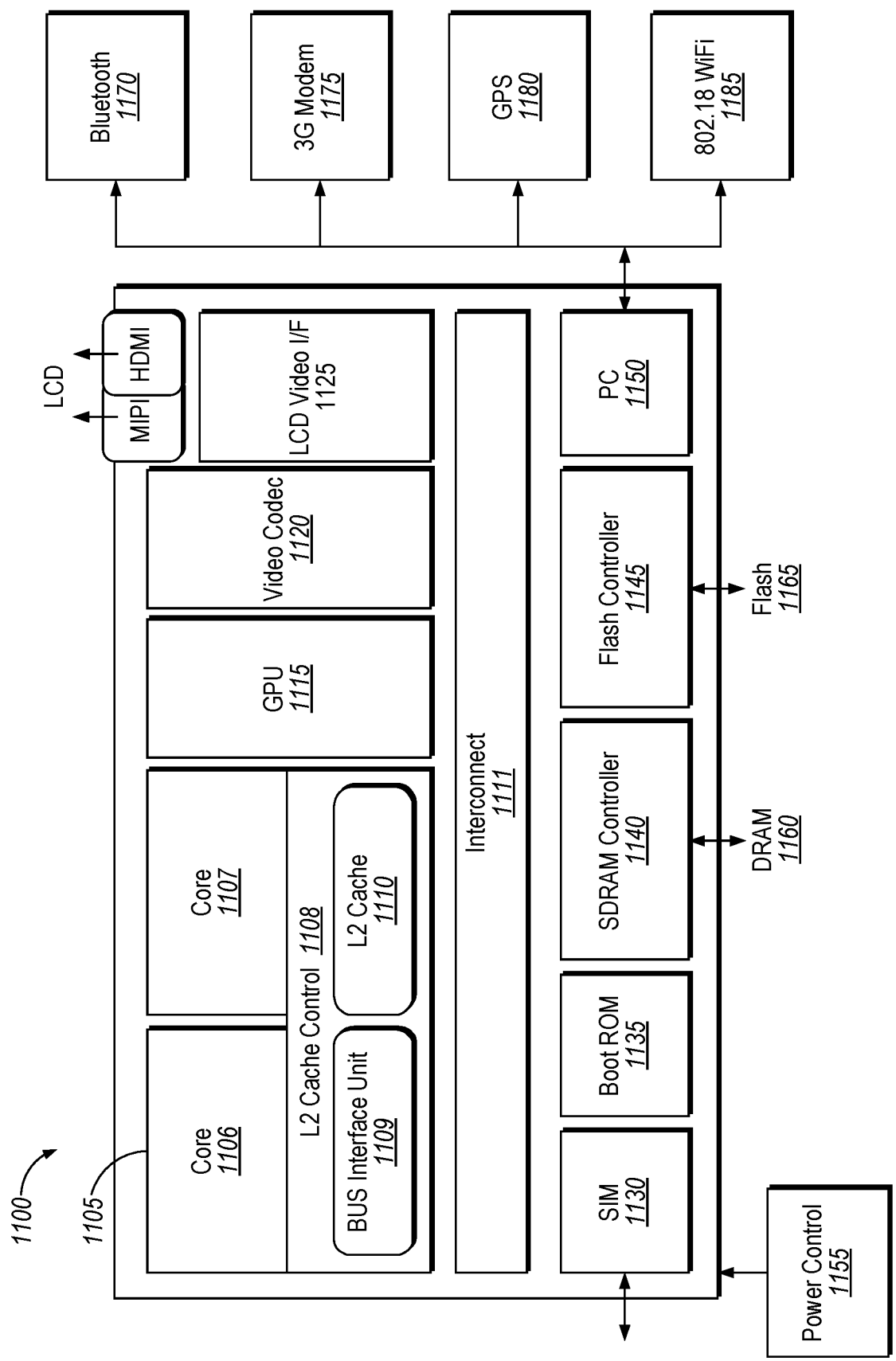
FIG. 11 illustrates another implementation of a block diagram for a computing system.

Turning next to FIG. 11, an implementation of a system on-chip (SoC) design that may implement hardware support for restartable cache write-back and invalidation, in accordance with implementations of the disclosure is depicted. As an illustrative example, SoC 1100 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

In one implementation, SDRAM controller 1140 may connect to interconnect 1111 via cache 1110. Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the implementations described herein.

In addition, the system illustrates peripherals for communication, such as a power control module 1155, a Bluetooth® module 1170, 3G modem 1175, GPS 1180, and Wi-Fi® 1185. Note as stated above, a UE includes a radio for communication. As a result, these peripheral communication modules may not all be included. However, in a UE some form of a radio for external communication should be included.

Figure 12:
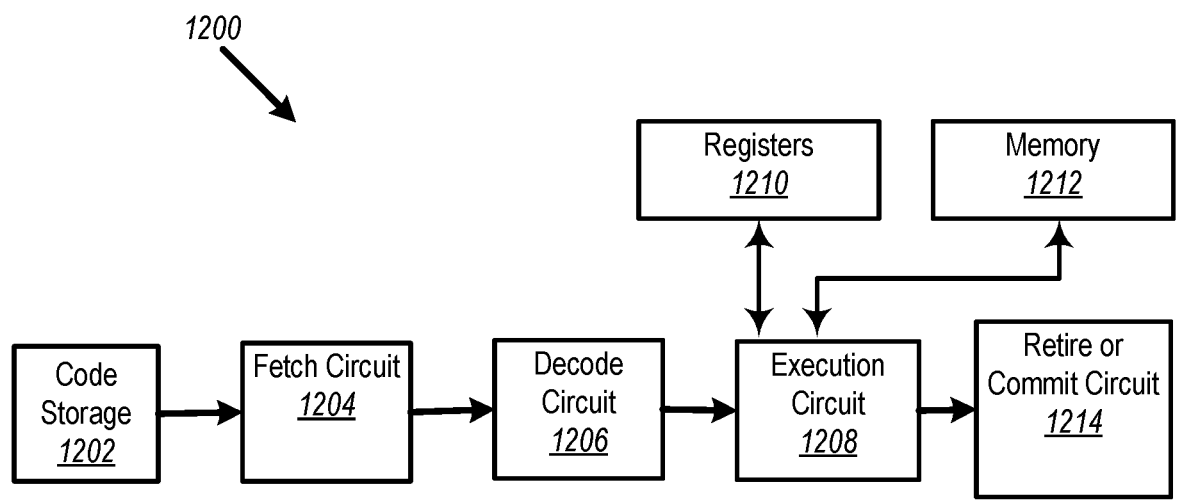
FIG. 12 is a block diagram of processing components for executing instructions that implements hardware support for restartable cache write-back and invalidation, according one implementation.
Figure 13:
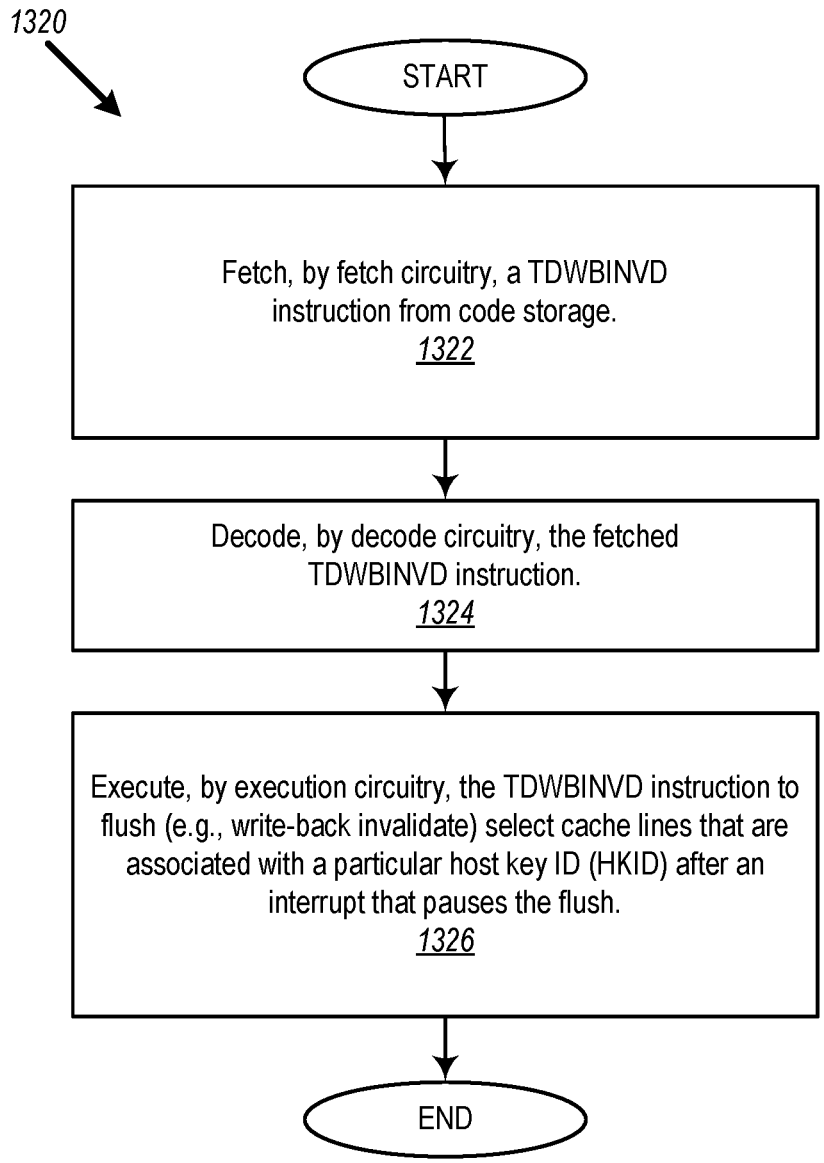
FIG. 13 is a flow diagram of an example method to be performed by a processor to execute an instruction to restartable cache write-back and invalidation.

FIG. 12 is a block diagram of processing components for executing instructions that implements restartable cache write-back and invalidation. As shown, computing system 1200 includes code storage 1202, fetch circuit 1204, decode circuit 1206, execution circuit 1208, registers 1210, memory 1212, and retire or commit circuit 1214. In operation, an instruction (e.g., TDWBINVD) is to be fetched by fetch circuit 1204 from code storage 1202, which may comprise a cache memory, an on-chip memory, a memory on the same die as the processor, an instruction register, a general register, or system memory, without limitation. In one implementation, the instruction may have a format similar to that of instruction 1400 in FIG. 14. After fetching the instruction from code storage 1202, decode circuit 1206 may decode the fetched instruction, including by parsing the various fields of the instruction. After decoding the fetched instruction, execution circuit 1208 is to execute the decoded instruction. In performing the step of executing the instruction, execution circuit 1208 may read data from and write data to registers 1210 and memory 1212. Registers 1210 may include a data register, an instruction register, a vector register, a mask register, a general register, an on-chip memory, a memory on the same die as the processor, or a memory in the same package as the processor, without limitation. Memory 1212 may include an on-chip memory, a memory on the same die as the processor, a memory in the same package as the processor, a cache memory, or system memory, without limitation. After the execution circuit executes the instruction, retire or commit circuit 1214 may retire the instruction, ensuring that execution results are written to or have been written to their destinations, and freeing up or releasing resources for later use.

FIG. 13A is a flow diagram of an example method 1320 to be performed by a processor to execute a TDWBINVD instruction to cause processor hardware to write back data to memory from select cache lines and invalidate those cache lines, e.g., perform a restartable flush on those cache lines. After starting the process, a fetch circuit at block 1322 is to fetch the TDWBINVD instruction from code storage. At optional block 1324, a decode circuit may decode the fetched TDWBINVD instruction. At block 1326, an execution circuit is to execute the TDWBINVD instruction to iteratively flush blocks of cache, e.g., walk the blocks of cache to identify cache lines associated with a particular key ID (e.g., HKID), write back data of the identified cache lines, and mark as invalid the identified cache lines. The TDWBINVD may be restartable after a pause of the cache flush in response to an interrupt such as the interrupts discussed herein, according to various implementations.

Figure 14:
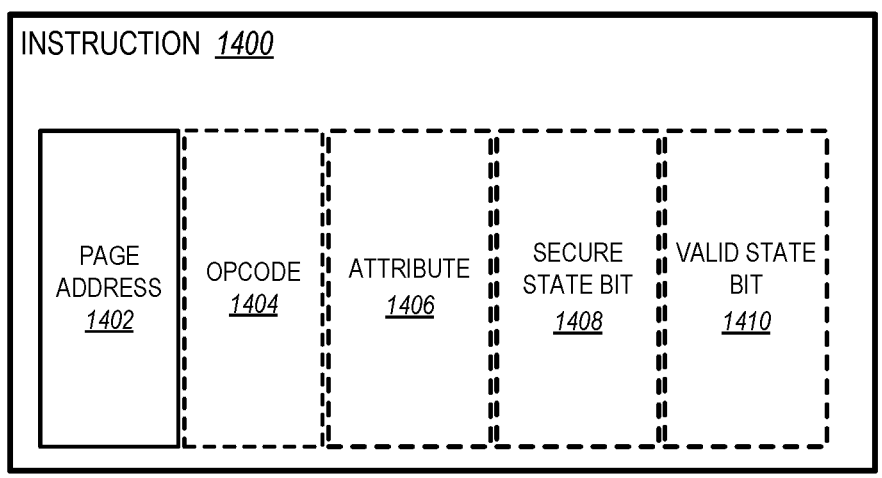
FIG. 14 is a block diagram illustrating an example format for instructions disclosed herein.

FIG. 14 is a block diagram illustrating an example format for instructions 1400 disclosed herein that implement hardware support for restartable cache write-back and invalidation. The instruction 1400 may be a TDWBINVD instruction. The parameters in the format of the instruction 1400 may be different for the TDWBINVD instruction. As such, some of the parameters are depicted as optional with dashed lines. As shown, the instruction 1400 includes a page address 1402, optional opcode 1404, optional attribute 1406, optional secure state bit 1408, and optional valid state bit 1410.

Figure 15:
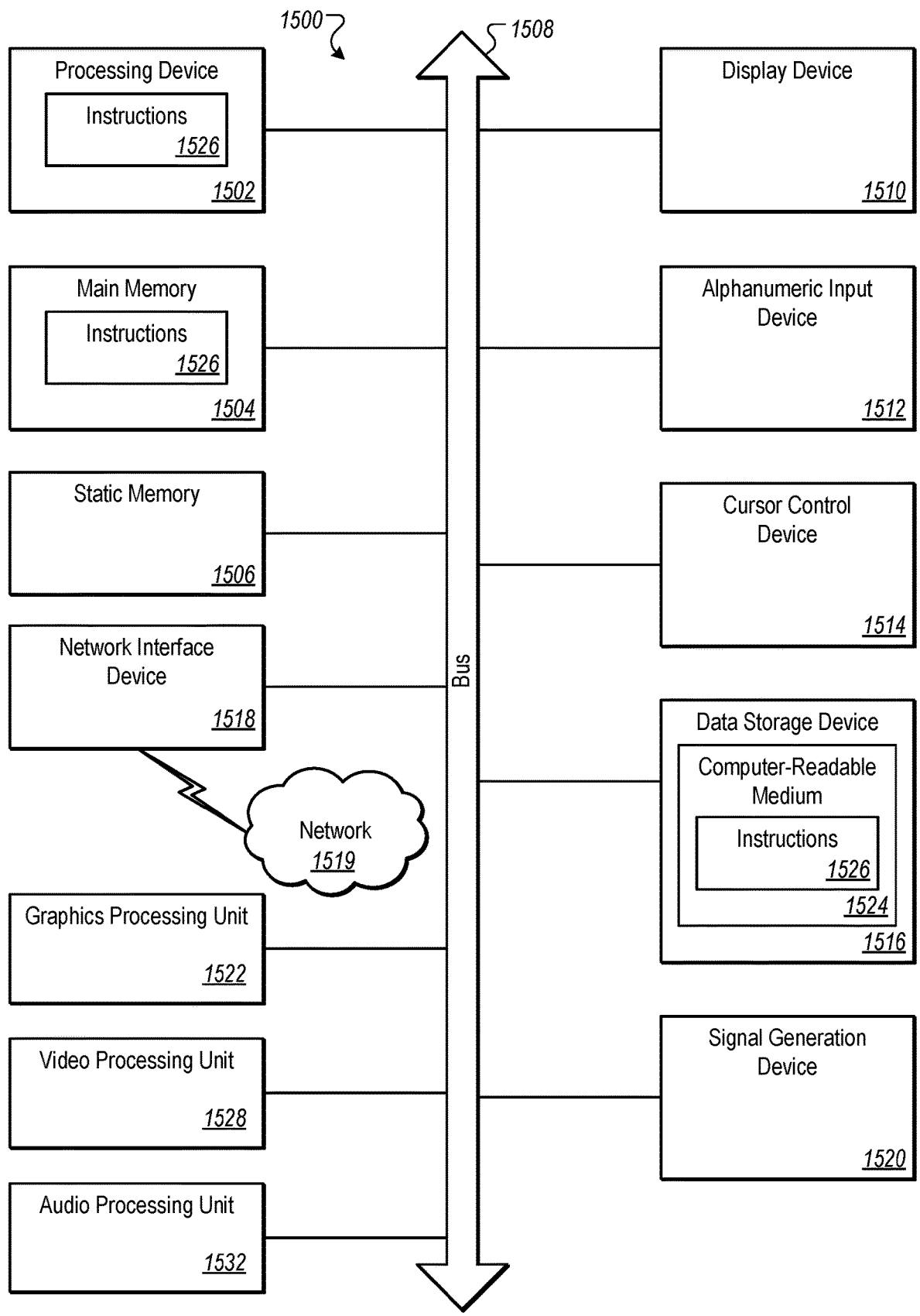
FIG. 15 illustrates another implementation of a block diagram for a computing system.

FIG. 15 illustrates a diagrammatic representation of a machine in the example form of a computing system 1500 within which a set of instructions, for causing the machine to implement hardware support for restartable cache write-back and invalidation according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1500.

The computing system 1500 includes a processing device 1502, main memory 1504 (e.g., flash memory, dynamic random access memory (DRAM) (such as synchronous DRAM (SDRAM) or DRAM (RDRAM), etc.), a static memory 1506 (e.g., flash memory, static random access memory (SRAM), etc.), and a data storage device 1516, which communicate with each other via a bus 1508.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application-specific integrated circuit (ASIC), a field programmable gate array (FPGA), a digital signal processor (DSP), network processor, or the like. In one implementation, processing device 1502 may include one or more processor cores. The processing device 1502 is configured to execute the processing logic 1526 for performing the operations discussed herein.

In one implementation, processing device 1502 can be part of a processor or an integrated circuit that includes the disclosed LLC caching architecture. Alternatively, the computing system 1500 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1500 may further include a network interface device 1518 communicably coupled to a network 1519. The computing system 1500 also may include a video display device 1510 (e.g., a liquid crystal display (LCD) or a cathode ray tube (CRT)), an alphanumeric input device 1512 (e.g., a keyboard), a cursor control device 1514 (e.g., a mouse), a signal generation device 1520 (e.g., a speaker), or other peripheral devices. Furthermore, computing system 1500 may include a graphics processing unit 1522, a video processing unit 1528 and an audio processing unit 1532. In another implementation, the computing system 1500 may include a chipset (not illustrated), which refers to a group of integrated circuits, or chips, that are designed to work with the processing device 1502 and controls communications between the processing device 1502 and external devices. For example, the chipset may be a set of chips on a motherboard that links the processing device 1502 to very high-speed devices, such as main memory 1504 and graphic controllers, as well as linking the processing device 1502 to lower-speed peripheral buses of peripherals, such as USB, PCI or ISA buses.

The data storage device 1516 may include a computer-readable storage medium 1524 on which is stored software 1526 embodying any one or more of the methodologies of functions described herein. The software 1526 may also reside, completely or at least partially, within the main memory 1504 as instructions 1526 and/or within the processing device 1502 as processing logic during execution thereof by the computing system 1500; the main memory 1504 and the processing device 1502 also constituting computer-readable storage media.

The computer-readable storage medium 1524 may also be used to store instructions 1526 utilizing the processing device 1502, and/or a software library containing methods that call the above applications. While the computer-readable storage medium 1524 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is processor comprising: 1) a global register to store a value of an interrupted block count; and 2) a processor core communicably coupled to the global register, the processor core to, upon execution of an instruction to flush blocks of a cache that are associated with a security domain: a) flush the blocks of the cache sequentially according to a flush loop of the cache; and b) in response to detection of a system interrupt: i) store a value of a current cache block count to the global register as the interrupted block count; and ii) stop execution of the instruction to pause the flush of the blocks of the cache.

In Example 2, the processor of Example 1, wherein the security domain comprises a first trust domain and a virtual machine manager (VMM) calls for execution of the instruction to flush the blocks of the cache, wherein the processor core is to execute the VMM, which is to: a) detect that the first trust domain, which owns a host key identifier (HKID) to be reclaimed for assignment to a second trust domain, is in a quiesced state; and b) call for execution of the instruction, which identifies the HKID, to flush the blocks of the cache that are associated with the first trust domain.

In Example 3, the processor of Example 2, wherein the processor core is further to tag the HKID as being in a reclaim state.

In Example 4, the processor of Example 2, wherein the processor core is further to: a) tag that the flush of the cache has started; and b) in response to the system interrupt, set an interrupt flag in a flag register that indicates the flush of the cache is interrupted.

In Example 5, the processor of Example 4, wherein the processor core is further to execute the VMM, which is to: a) detect the interrupt flag is set within the flag register; b)

handle the interrupt; and c) reissue a call for execution of the instruction to complete flush of the cache.

In Example 6, the processor of Example 5, wherein the processor core is further to: a) retrieve the interrupted block count stored in the global register; and b) resume execution of the instruction to resume the flush of the cache from a location within the cache identified by the value of the interrupted block count.

In Example 7, the processor of Example 5, wherein the processor core is further to, in response to completion of the flush: a) set a completion flag in the flag register to indicate successful cache flush completion; and b) reset to zero the value of the interrupt block count in the global register.

In Example 8, the processor of Example 1, wherein the processor core is further to, during each iteration of the flush loop, store a value of the current cache block count in the global register.

In Example 9, the processor of Example 1, wherein the interrupted block count comprises an iteration number of the flush loop at which the system interrupt occurs, and wherein the cache comprises all caches available to the processor core for caching.

Various implementations may have different combinations of the structural features described above. For instance, all optional features of the processors and methods described above may also be implemented with respect to a system described herein and specifics in the examples may be used anywhere in one or more implementations.

Example 10 is a system computing system comprising: 1) a cache to store data read from a memory device; 2) a global register to store a value of an interrupted block count; and 3) a processor core to execute a virtual machine manager (VMM) to: a) detect that a first trust domain, which owns a host key identifier (HKID) to be reclaimed for assignment to a second trust domain, is in a quiesced state; and b) call for execution of an instruction, which identifies the HKID, to flush blocks of the cache that are associated with the first trust domain; c) a processor comprising the processor core, the global register, and the cache, d) wherein the processor is to, upon execution of the instruction: i) flush the blocks of the cache sequentially according to a flush loop of the cache; ii) store a value of a current cache block count, at each iteration of the flush loop, into the global register; iii) detect a system interrupt; and iv) stop execution of the instruction to pause the flush of the cache in response to the system interrupt.

In Example 11, the system of Example 10, wherein the current cache block count, in response to the pause, is the interrupt block count in the global register, and wherein the global register comprises protected hardware.

In Example 12, the system of Example 10, wherein the processor is further to: a) tag, within key identifier (ID) tracker logic, that the flush of the cache has started; and b) in response to the system interrupt, set an interrupt flag in a flag register that indicates the flush of the cache is interrupted.

In Example 13, the system of Example 12, wherein the processor core is further to execute the VMM, which is to: a) detect the interrupt flag is set within the flag register; b) handle the interrupt; and c) reissue a call for execution of the instruction to complete flush of the cache.

In Example 14, the system of Example 13, wherein the processor is further to: a) retrieve the interrupted block count stored in the global register; and b) resume execution of the instruction to resume the flush of the cache from a location within the cache identified by the value of the interrupted block count.

In Example 15, the system of Example 13, wherein the processor is further to, in response to completion of the flush: a) set a completion flag in the flag register to indicate successful cache flush completion; and b) reset to zero the value of the interrupt block count in the global register.

In Example 16, the system of Example 10, wherein the processor is further to tag the HKID as being in a reclaim state.

In Example 17, the system of Example 10, wherein the interrupted block count comprises an iteration number of the flush loop at which the system interrupt occurs.

Various implementations may have different combinations of the structural features described above. For instance, all optional features of the processors and methods described above may also be implemented with respect to a system described herein and specifics in the examples may be used anywhere in one or more implementations.

Example 18 is a method comprising: 1) detecting, by a virtual machine monitor (VMM) running on a processor, that a first trust domain, which owns a host key identifier (HKID) to be reclaimed for assignment to a second trust domain, is in a quiesced state; 2) calling, by the VMM, for execution of an instruction, which identifies the HKID, to flush blocks of cache that are associated with the first trust domain; 3) initializing, by processor hardware of the processor during execution of the instruction, a value for a current cache block count associated with blocks of the cache; and 4) iteratively, by the processor hardware, over a flush loop of the cache: a) flushing a cache block associated with the value for the current cache block count; b) incrementing the value for the current cache block count; c) determining whether the value for the current cache block count is equal to a total number of cache blocks of the cache; and d) detecting whether an interrupt is pending; and in response to detecting a system interrupt is pending: e) stopping execution of the instruction to pause the flush of the cache; and f) storing the current cache block count into protected hardware storage as an interrupted block count.

In Example 19, the method of Example 18, wherein initializing the value for the current cache block count comprises setting the value of the current cache block count to be a value of the interrupted block count upon beginning execution of the instruction.

In Example 20, the method of Example 18, wherein, in response to the value for the current cache block count being equal to the total number of cache blocks: a) setting a completion flag in a flag register; and b) setting the interrupt block count to a zero value.

In Example 21, the method of Example 18, further comprising setting an interrupt flag in a flag register that indicates the flush of the cache is interrupted.

In Example 22, the method of Example 21, further comprising: a) detecting, by the VMM, the interrupt flag is set within the flag register; b) handling, by the VMM, the system interrupt; and c) reissuing, by the VMM, a call for execution of the instruction to complete flush of the cache.

In Example 23, the method of Example 22, further comprising: a) retrieving, by the processor hardware, the interrupted block count stored in the protected hardware storage; and b) resuming, by the processor hardware, execution of the instruction to resume the flush of the cache from a location within the cache identified by the value of the interrupted block count.

In Example 24, the method of Example 22, further comprising, in response to completion of the flush: a) setting a completion flag in the flag register to indicate successful cache flush completion; and b) resetting to zero the value of the interrupt block count in the protected hardware storage.

In Example 25, the method of Example 18, wherein the interrupted block count comprises an iteration number of the flush loop at which the system interrupt is detected.

Various implementations may have different combinations of the structural features described above. For instance, all optional features of the processors and methods described above may also be implemented with respect to a system described herein and specifics in the examples may be used anywhere in one or more implementations.

Example 26 is a non-transitory computer readable medium storing instructions, which when executed by a processor, cause the processor to perform a plurality of operations comprising: 1) storing, in a global register, a value of an interrupted block count; and executing an instruction to flush blocks of a cache that are associated with a security domain, wherein in response to execution of the instruction, 2) flushing the blocks of the cache sequentially according to a flush loop of the cache, and, 3) in response to detecting a system interrupt: a) storing a value of a current cache block count to the global register as the interrupted block count, and b) stopping execution of the instruction to pause the flush of the blocks of the cache.

In Example 27, the non-transitory computer readable medium of Example 26, wherein the security domain comprises a first trust domain, and wherein the plurality of operations further comprises: a) calling, by a virtual machine manager (VMM), for execution of the instruction to flush the blocks of the cache, in response to which, b) detecting that the first trust domain, which owns a host key identifier (HKID) to be reclaimed for assignment to a second trust domain, is in a quiesced state; and c) calling for execution of the instruction, which identifies the HKID, to flush the blocks of the cache that are associated with the first trust domain.

In Example 28, the non-transitory computer readable medium of Example 27, wherein the plurality of instructions further comprise tagging the HKID as being in a reclaim state.

In Example 29, the non-transitory computer readable medium of Example 27, wherein the plurality of operations further comprise: a) tagging that the flush of the cache has started; and in response to the system interrupt, b) setting an interrupt flag in a flag register that indicates the flush of the cache is interrupted.

In Example 30, the non-transitory computer readable medium of Example 29, wherein the plurality of operations further comprise: a) detecting the interrupt flag is set within the flag register; b) handling the interrupt; and c) reissuing a call for execution of the instruction to complete flush of the cache.

In Example 31, the non-transitory computer readable medium of Example 30, wherein the plurality of operations further comprise: a) retrieving the interrupted block count stored in the global register; and b) resuming execution of the instruction to resume the flush of the cache from a location within the cache identified by the value of the interrupted block count.

In Example 32, the non-transitory computer readable medium of Example 30, wherein the plurality of operations further comprise, in response to completion of the flush: a) setting a completion flag in the flag register to indicate successful cache flush completion; and b) resetting to zero the value of the interrupt block count in the global register.

In Example 33, the non-transitory computer readable medium of Example 26, wherein the plurality of operations are further to, during each iteration of the flush loop, store a value of the current cache block count in the global register.

In Example 34, the non-transitory computer readable medium of Example 26, wherein the interrupted block count comprises an iteration number of the flush loop at which the system interrupt occurs, and wherein the cache comprises all caches available to the processor core for caching.

Various implementations may have different combinations of the structural features described above. For instance, all optional features of the processors and methods described above may also be implemented with respect to a system described herein and specifics in the examples may be used anywhere in one or more implementations.

Example 31 is a system comprising: 1) means for storing, in a global register, a value of an interrupted block count; and executing an instruction to flush blocks of a cache that are associated with a security domain, wherein in response to execution of the instruction, 2) means for flushing the blocks of the cache sequentially according to a flush loop of the cache, and, 3) in response to detecting a system interrupt: a) means for storing a value of a current cache block count to the global register as the interrupted block count, and b) means for stopping execution of the instruction to pause the flush of the blocks of the cache.

In Example 32, the system of Example 31, wherein the security domain comprises a first trust domain, and further comprising: a) means for calling for execution of the instruction to flush the blocks of the cache, in response to which, b) means for detecting that the first trust domain, which owns a host key identifier (HKID) to be reclaimed for assignment to a second trust domain, is in a quiesced state; and c) means for calling for execution of the instruction, which identifies the HKID, to flush the blocks of the cache that are associated with the first trust domain.

In Example 33, the system of Example 32, further comprising means for tagging the HKID as being in a reclaim state.

In Example 34, the system of Example 32, further comprising: a) means for tagging that the flush of the cache has started; and in response to the system interrupt, b) means for setting an interrupt flag in a flag register that indicates the flush of the cache is interrupted.

In Example 35, the system of Example 34, further comprising: a) means for detecting the interrupt flag is set within the flag register; b) means for handling the interrupt; and c) means for reissuing a call for execution of the instruction to complete flush of the cache.

In Example 36, the system of Example 35, further comprising: a) means for retrieving the interrupted block count stored in the global register; and b) means for resuming execution of the instruction to resume the flush of the cache from a location within the cache identified by the value of the interrupted block count.

In Example 37, the system of Example 35, further comprise, in response to completion of the flush: a) means for setting a completion flag in the flag register to indicate successful cache flush completion; and b) means for resetting to zero the value of the interrupt block count in the global register.

In Example 38, the system of Example 31, further comprising, during each iteration of the flush loop, means for storing a value of the current cache block count in the global register.

In Example 39, the system of Example 31, wherein the interrupted block count comprises an iteration number of the flush loop at which the system interrupt occurs, and wherein the cache comprises all caches available to the processor core for caching.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' 'capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
    a secure data store to store an indicator of an interrupted block count; and
    a processor core communicably coupled to the secure data store, the processor core to, upon execution of an instruction to flush blocks of a cache associated with a security domain:
        flush the blocks of the cache sequentially according to a flush loop of the cache;
        during each iteration of the flush loop, store an indicator of a current cache block count in the secure data store; and
        in response to detection of a system interrupt:
            stop execution of the instruction to pause the flush of the blocks of the cache; and
            in response to the pause, the indicator of the current cache block count in the secure data store is the indicator of the interrupt block count.

2. The processor of claim 1, wherein the security domain comprises a first trust domain and a virtual machine manager (VMM) calls for execution of the instruction to flush the blocks of the cache, wherein the processor core is to execute the VMM, which is to:
    detect that the first trust domain, which owns a host key identifier (HKID) to be reclaimed for assignment to a second trust domain, is in a quiesced state; and
    call for execution of the instruction, which identifies the HKID, to flush the blocks of the cache that are associated with the first trust domain.

3. The processor of claim 2, wherein the processor core is further to:
    tag that the flush of the cache has started; and
    in response to the system interrupt, set an interrupt flag in a flag register that indicates the flush of the cache is interrupted.

4. The processor of claim 3, wherein the processor core is further to execute the VMM, which is to:
    detect the interrupt flag is set within the flag register;
    handle the system interrupt; and
    reissue a call for execution of the instruction to complete flush of the cache.

5. The processor of claim 4, wherein the processor core is further to:

retrieve the indicator of the interrupted block count stored in the secure data store; and resume execution of the instruction to resume the flush of the cache from a location within the cache identified by the indicator of the interrupted block count.

6. The processor of claim 4, wherein the processor core is further to, in response to completion of the flush:

set a completion flag in the flag register to indicate successful cache flush completion; and reset the indicator of the value of the interrupt block count in the secure data store.

7. The processor of claim 1, wherein the indicator of the interrupted block count comprises an iteration number of the flush loop at which the system interrupt occurs, and wherein the cache comprises all caches available to the processor core for caching.

8. A system comprising:

a cache to store data read from a memory device;

a secure data store to store an indicator of an interrupted block count; and a processor comprising a processor core, the processor core, upon execution of an instruction to flush blocks of the cache associated with a first trust domain, to:

flush the blocks of the cache sequentially according to a flush loop of the cache;

store an indicator of a current cache block count, at each iteration of the flush loop, into the secure data store;

detect a system interrupt;

stop execution of the instruction to pause the flush of the cache in response to the system interrupt; and in response to the pause, the indicator of the current cache block count in the secure data store is the indicator of the interrupt block count.

9. The system of claim 8, wherein the secure data store comprises protected hardware.

10. The system of claim 8, wherein the processor is further to:

tag, within key identifier (ID) tracker logic, that the flush of the cache has started; and in response to the system interrupt, set an interrupt flag in a flag register that indicates the flush of the cache is interrupted.

11. The system of claim 10, wherein the processor core is further to execute a virtual machine manager (VMM), which is to:

detect the interrupt flag is set within the flag register;

handle the system interrupt; and reissue a call for execution of the instruction to complete flush of the cache.

12. The system of claim 11, wherein the processor is further to:

retrieve the interrupted block count stored in the secure data store; and resume execution of the instruction to resume the flush of the cache from a location within the cache identified by the indicator of the interrupted block count.

13. The system of claim 8, wherein the processor core is further to execute a virtual machine manager (VMM) to:

detect that the first trust domain, which owns a host key identifier (HKID) to be reclaimed for assignment to a second trust domain, is in a quiesced state; and call for execution of an instruction, which identifies the HKID, to flush the blocks of the cache that are associated with the first trust domain;

and wherein the processor is further to tag the HKID as being in a reclaim state.

14. The system of claim 8, wherein the indicator of the interrupted block count comprises an iteration number of the flush loop at which the system interrupt occurs.

15. A method comprising:

executing, by a processor, an instruction to flush blocks of a cache associated with a first trust domain;

initializing, by the processor during execution of the instruction, an indicator of a current cache block count; and iteratively, by the processor, over a flush loop of the cache:

flushing a cache block associated with the indicator of the current cache block count;

incrementing the indicator of the current cache block count;

determining whether the indicator of the current cache block count corresponds to a total of the cache blocks of the cache;

detecting whether an interrupt is pending; and in response to detecting a system interrupt is pending:

stopping execution of the instruction to pause the flush of the cache; and storing the indicator of the current cache block count into protected hardware storage as an interrupted block count.

16. The method of claim 15, wherein initializing the indicator of the current cache block count comprises setting the indicator of the current cache block count to be an indicator of the interrupted block count upon beginning execution of the instruction.

17. The method of claim 15, wherein, in response to the indicator for the current cache block count being equal to the total cache blocks:

setting a completion flag in a flag register; and setting the interrupt block count to a zero value.

18. The method of claim 15, further comprising:

detecting, by a virtual machine monitor (VMM) running on the processor, prior to executing the instruction, that the first trust domain, which owns a host key identifier (HKID) to be reclaimed for assignment to a second trust domain, is in a quiesced state;

calling by the VMM prior to executing the instruction, for execution of the instruction, which identifies the HKID, to flush blocks of the cache that are associated with the first trust domain;

setting an interrupt flag in a flag register that indicates the flush of the cache is interrupted;

detecting, by the VMM, the interrupt flag is set within the flag register; handling, by the VMM, the system interrupt; and reissuing, by the VMM, a call for execution of the instruction to complete flush of the cache.

19. The method of claim 18, further comprising:

retrieving, by the processor hardware, the interrupted block count stored in the protected hardware storage; and resuming, by the processor hardware, execution of the instruction to resume the flush of the cache from a location within the cache identified by the indicator of the interrupted block count.

20. The method of claim 18, further comprising, in response to completion of the flush:

setting a completion flag in the flag register to indicate successful cache flush completion; and resetting the indicator of the interrupt block count in the protected hardware storage.

\* \* \* \* \*